(12) United States Patent
Booth et al.

(10) Patent No.: US 10,588,454 B1
(45) Date of Patent: Mar. 17, 2020

(54) DRY WELL FOOD WARMER ASSEMBLY AND METHOD

(71) Applicant: WELLS BLOOMFIELD LLC, St. Louis, MO (US)

(72) Inventors: William E. Booth, St. Louis, MO (US); Thomas Hunot, Bridgeton, MO (US)

( * ) Notice: Subject to any disclaimer, the term of this patent is extended or adjusted under 35 U.S.C. 154(b) by 777 days.

(21) Appl. No.: 14/708,745

(22) Filed: May 11, 2015

Related U.S. Application Data

(60) Provisional application No. 61/993,893, filed on May 15, 2014.

(51) Int. Cl.
*A21B 1/22* (2006.01)
*A47J 36/24* (2006.01)

(52) U.S. Cl.
CPC ................ *A47J 36/2483* (2013.01)

(58) Field of Classification Search
CPC ........ A47J 36/2483; A21B 1/245; A21B 2/00; A23L 3/10; F24C 7/087; F24C 15/16; H05B 6/6473; H05B 6/66; H05B 6/745; H05B 6/782
See application file for complete search history.

(56) References Cited

U.S. PATENT DOCUMENTS

| | | | |
|---|---|---|---|
| 2,679,841 A | | 6/1954 | Muckler |
| 3,500,813 A | * | 3/1970 | Opdahl .................. F24C 15/12 |
| 3,529,582 A | * | 9/1970 | Bohdan .................. F24C 15/325 |
| | | | 126/21 R |
| 3,692,968 A | * | 9/1972 | Yasuoka .............. H05B 6/6485 |
| | | | 219/400 |
| 3,828,760 A | * | 8/1974 | Farber ...................... A21B 1/02 |
| | | | 126/21 A |
| 3,884,213 A | * | 5/1975 | Smith ..................... A21B 1/245 |
| | | | 126/19 R |
| 3,962,962 A | | 6/1976 | Anderson |
| 4,233,495 A | | 11/1980 | Scoville et al. |
| 4,374,319 A | * | 2/1983 | Guibert ................... A23L 3/365 |
| | | | 126/21 A |
| 4,426,923 A | * | 1/1984 | Ohata ................... A47J 39/003 |
| | | | 126/20 |
| 4,481,396 A | * | 11/1984 | Matsubayashi ....... F24C 15/006 |
| | | | 126/21 A |
| 4,728,762 A | * | 3/1988 | Roth ..................... A47J 36/027 |
| | | | 219/681 |

(Continued)

*Primary Examiner* — Steven N Leff
(74) *Attorney, Agent, or Firm* — Brinks Gilson & Lione

(57) ABSTRACT

A dry well food warmer assembly and method for warming food with a serving pan, comprises a housing having a well, surrounding wall structure and bottom wall; a heating element within the well generally oriented parallel to the floor, and a blower rotatably mounted for blowing air toward the outer wall and about the heating element. A baffle is located above the heating element and generally parallel to the floor and element, with a plurality of suitably sized intake and passageway openings for airflow and directioning. The method comprises energizing the element to heat air within the well, energizing the blower to rotate generally perpendicularly to blow outwardly to and past the element toward the outer structure, to pass outside and above the baffle, and through the baffle towards the blower. A pan and food within it positioned within the well can be heated by the assembly and method.

22 Claims, 18 Drawing Sheets

(56) References Cited

U.S. PATENT DOCUMENTS

| | | | | |
|---|---|---|---|---|
| 4,817,509 | A | * | 4/1989 | Erickson ............... A47J 37/015 |
| | | | | 219/386 |
| 5,699,722 | A | * | 12/1997 | Erickson ............ A47J 37/0623 |
| | | | | 126/21 A |
| 5,718,124 | A | * | 2/1998 | Senecal ................ A47F 3/0443 |
| | | | | 62/3.6 |
| 6,114,659 | A | | 9/2000 | Finck et al. |
| 6,173,506 | B1 | * | 1/2001 | Kruepke ............. A23N 12/083 |
| | | | | 34/225 |
| 6,267,046 | B1 | * | 7/2001 | Wanat .................... A47J 27/05 |
| | | | | 99/332 |
| 6,651,445 | B1 | * | 11/2003 | Clark ...................... F25B 21/04 |
| | | | | 62/3.6 |
| 7,045,745 | B2 | * | 5/2006 | Kim ..................... F24C 15/327 |
| | | | | 126/348 |
| 8,437,627 | B1 | | 5/2013 | Magner |
| 2003/0205569 | A1 | * | 11/2003 | Chang ................ A47J 37/0623 |
| | | | | 219/400 |
| 2004/0149731 | A1 | | 8/2004 | Bollmers et al. |
| 2004/0169035 | A1 | | 9/2004 | Bollmers et al. |
| 2005/0183716 | A1 | * | 8/2005 | Oosterling ............ A47J 37/047 |
| | | | | 126/369 |
| 2008/0245783 | A1 | | 10/2008 | Aoyama et al. |
| 2009/0277914 | A1 | | 11/2009 | Guyn et al. |
| 2011/0253699 | A1 | | 10/2011 | Morin et al. |
| 2012/0213901 | A1 | | 8/2012 | Kyris et al. |
| 2013/0240501 | A1 | | 9/2013 | Gonzalez |
| 2014/0013965 | A1 | | 1/2014 | Perez |

\* cited by examiner

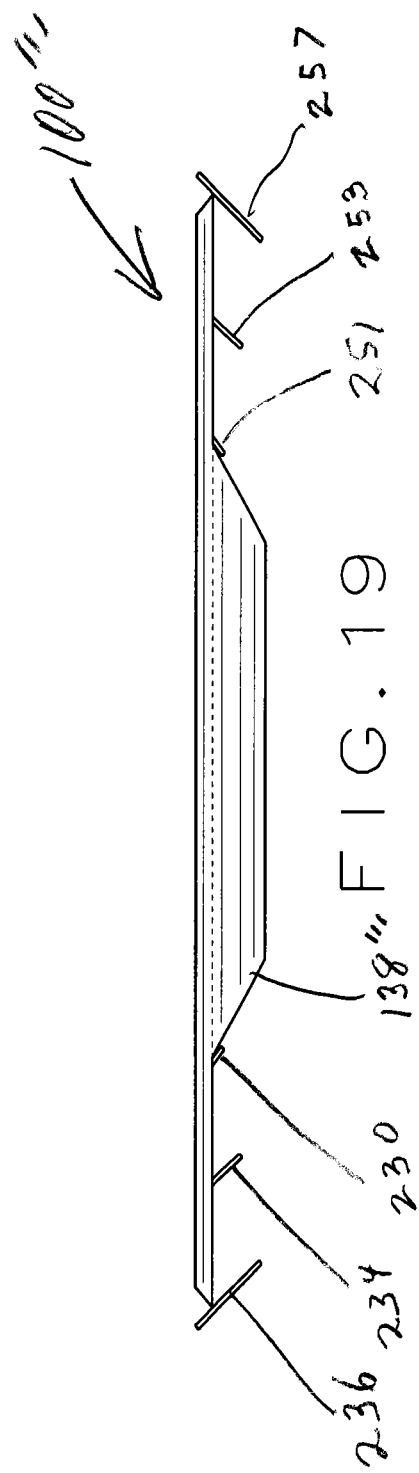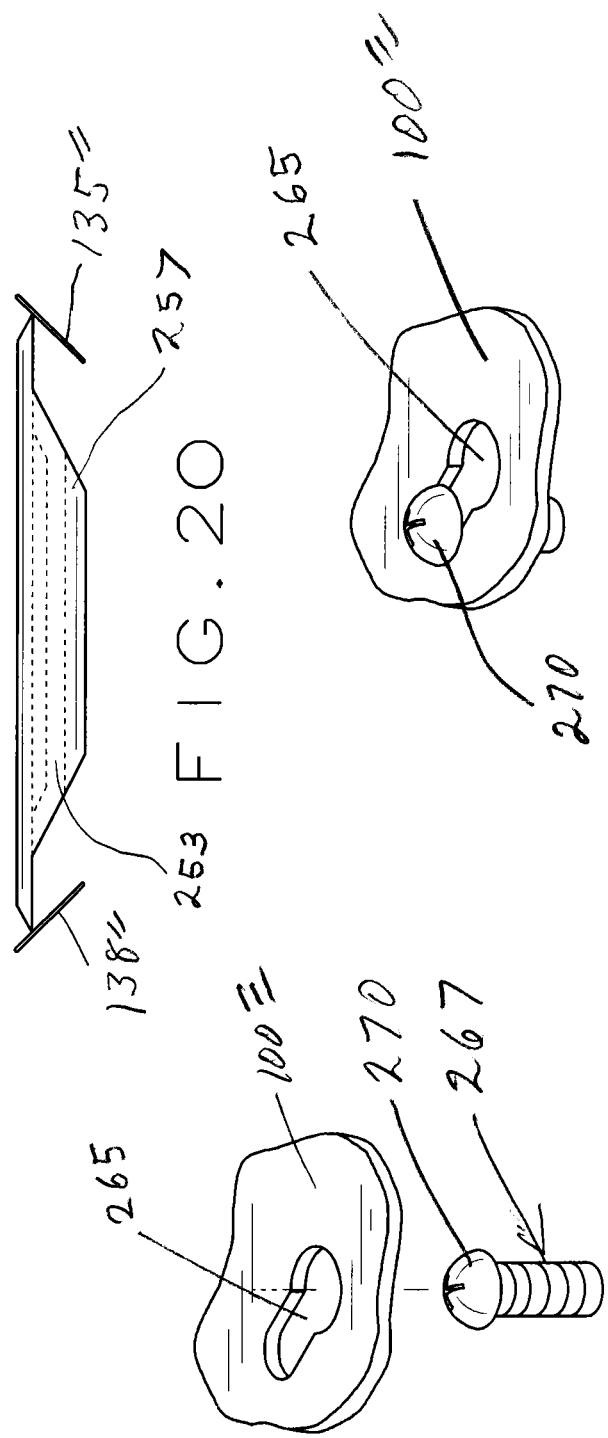

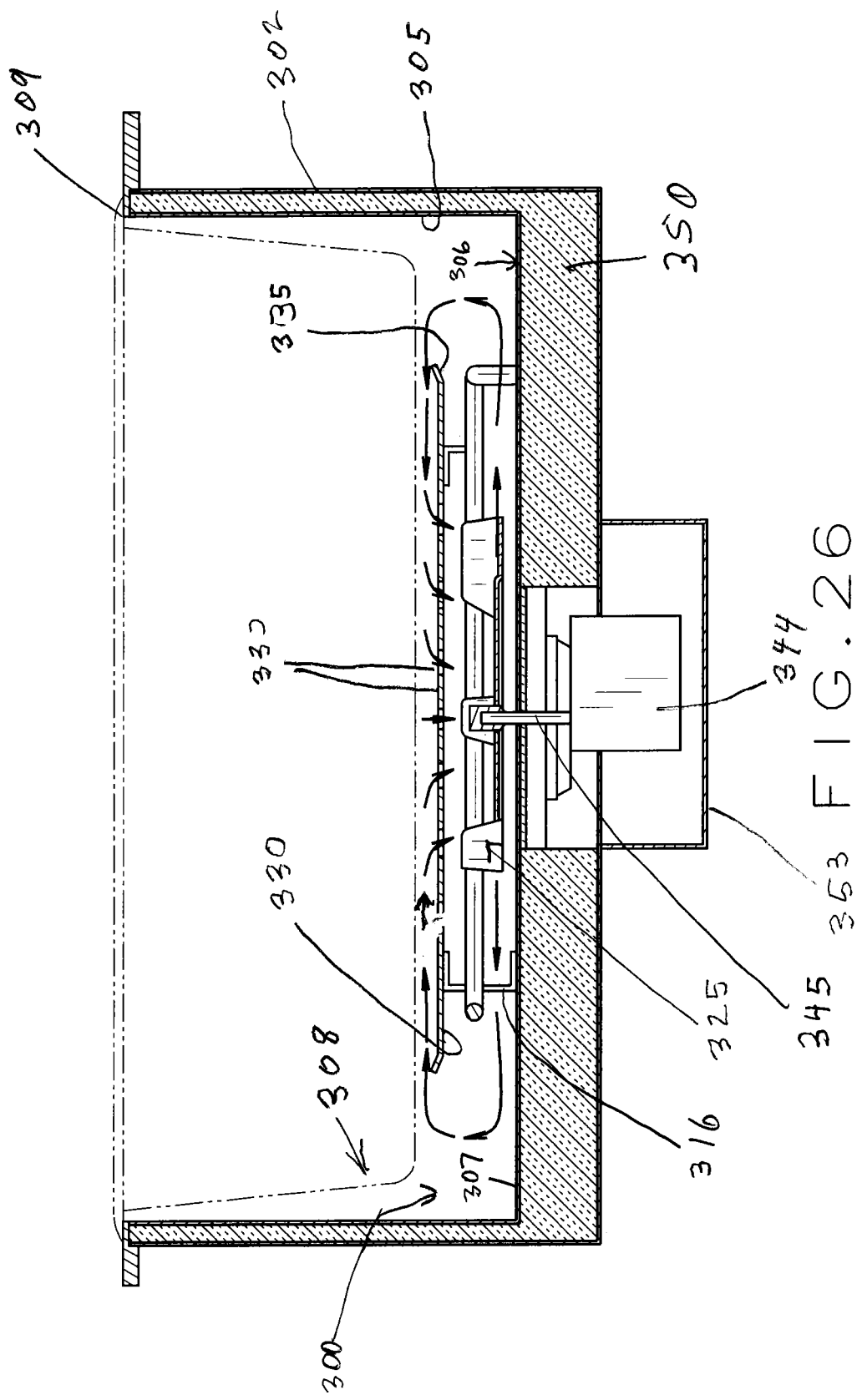

DRY WELL FOOD WARMER ASSEMBLY AND METHOD

CROSS-REFERENCE TO RELATED APPLICATIONS

This application claims priority to U.S. Provisional Patent Application No. 61/993,893 filed on May 15, 2014, with named inventors William E. Booth and Thomas Hunot. Said application is incorporated herein by reference herein.

STATEMENT REGARDING FEDERALLY SPONSORED RESEARCH

Not Applicable.

BACKGROUND AND FIELD OF INVENTION

This invention relates to dry well warmers for human food.

DESCRIPTION OF THE DRAWINGS

Basically there are generally two types of food warmers. One type is a countertop type, also known as a stand-alone or portable type. The other type is a built-in type, such as a drop-in arrangement, or a bottom mount arrangement. In the drawings both types are depicted. Because the principal features of the disclosure apply to both types, some drawings such as FIGS. 1-3 show the countertop type, while other drawings such as FIGS. 4, 5, 10, 13 and 14 show a built-in type. The section views of FIGS. 4, 5, 10, 13 and 14 show the well wall structure and the components within the well which are the same in either the countertop type or built-in type, but those Figures do not show for example the legs or the control knob mounted to the housing.

FIG. 19 is an elevation of the baffle of FIG. 17 viewed looking at the longitudinal side of the baffle; and FIG. 20 is an elevation looking toward the right end of the baffle of FIG. 18;

FIG. 21 is an isolated exploded view of a stud and a keyhole opening in a baffle for mounting of the baffle;

FIG. 22 is an isolated view of the stud and keyhole opening of FIG. 21, with the stud shown inserted though the keyhole opening in a mounted position;

FIG. 26 is a section view taken on the line 26-26 of FIG. 25;

DISCLOSURE OF ASSEMBLY AND METHOD

General Overview of Description of Disclosure

Figure 1:
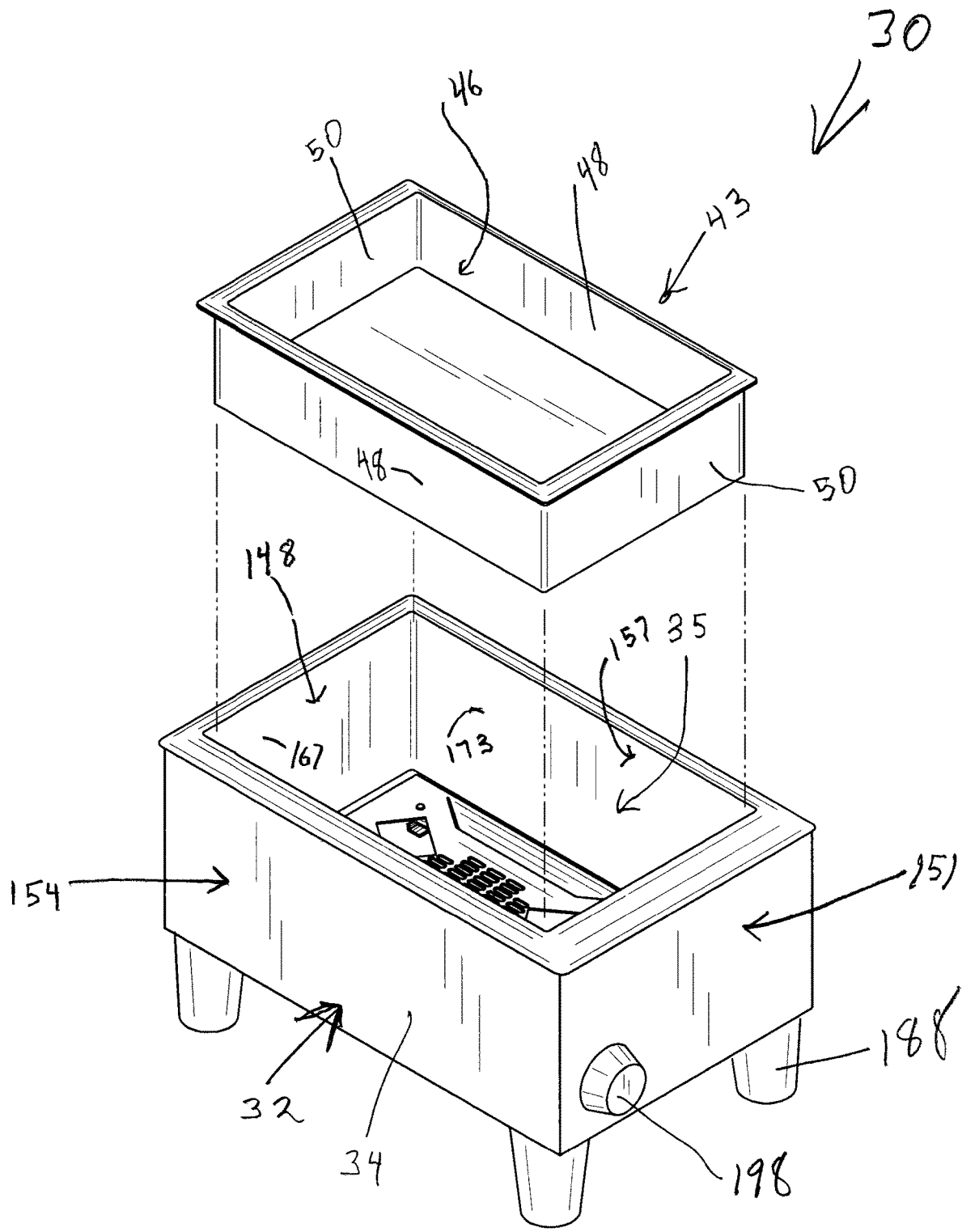
FIG. 1 is an exploded isometric view of a dry well convection food warmer assembly.
Figure 2:
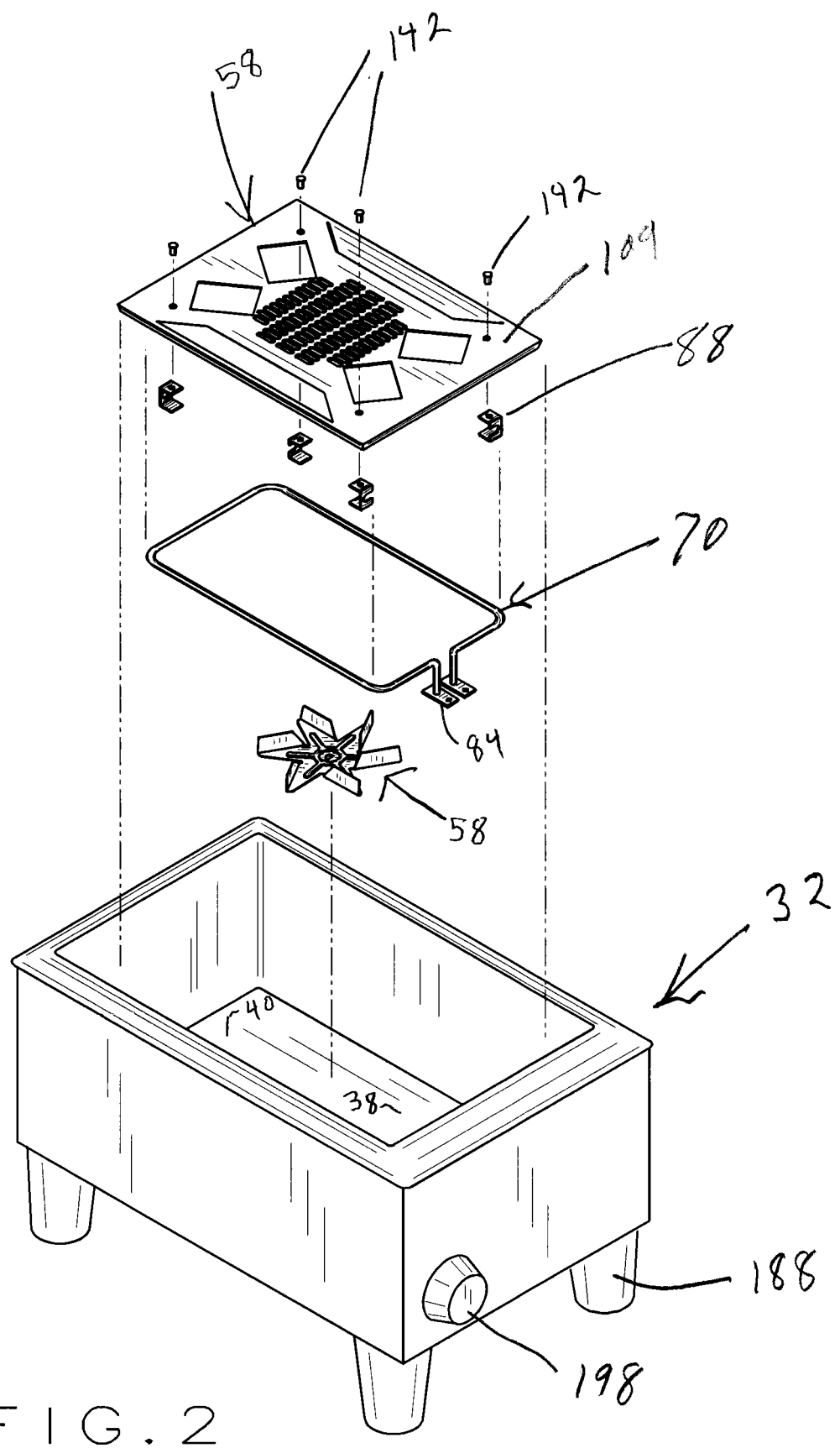
FIG. 2 is an exploded isometric view of a dry well convection food warmer assembly of FIG. 1, with the serving pan omitted for clarity, and with the blower, heating element, baffle and brackets exploded from the housing.
Figure 3:
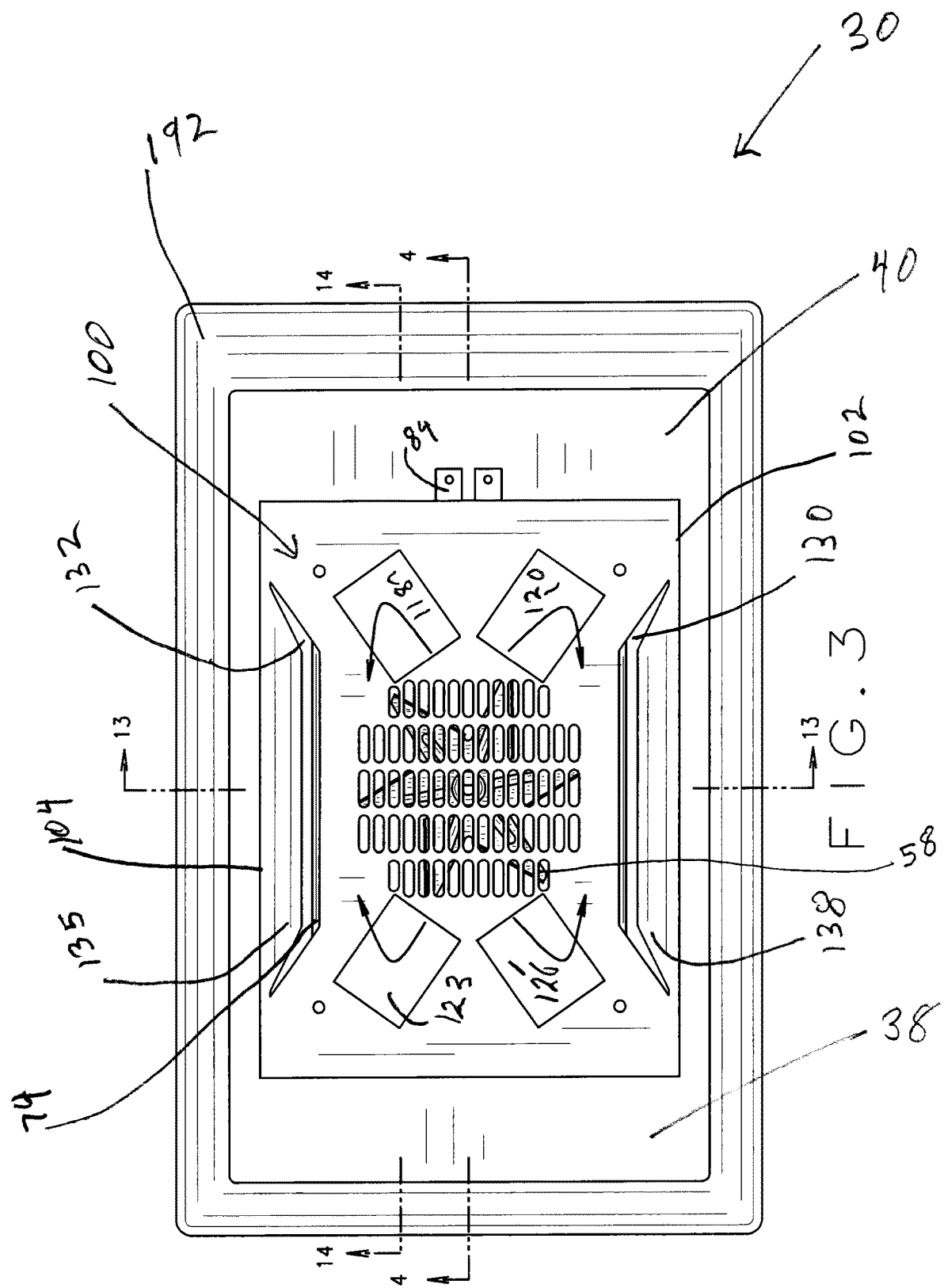
FIG. 3 is top plan view of the assembly with the serving pan omitted and not showing the control dial.

First shall be given a general overview of the system and method. Referring to the drawings, a dry well food warmer assembly 30 is illustrated. As discussed in the introduction to the Description Of The Drawings, there are generally two types of food warmers. One type being a countertop type, also known as a stand-alone or portable type. The other type is a built-in type, such as a drop-in arrangement, or a bottom mount arrangement. Because the principal features of the disclosure apply to both types, some drawings such as FIGS. 1-3 show the countertop type, while other drawings such as FIGS. 4, 5, 10, 13 and 14 show a built-in type. In the built-in type there are no legs such as shown in FIG. 1. Also for the built in type the controls are not mounted as in FIG. 1, but are in a box or housing that can be placed on or in a counter. The section views of FIGS. 4, 5, 10, 13 and 14 show the well wall structure and the components within the well which are the same in either the countertop type or built-in type.

Referring now specifically to FIGS. 1-5, the assembly 30 for warming food has a housing 32 having a main frame 34 within which a dry well 35 is located. The frame 34 generally has a bottom wall 36 with an inner liner floor layer 38. Floor layer 38 has an upper surface 40, and forms the bottom of well 35. A serving pan 43 having a basin 46 for containing food can be mounted on the housing 32, so that the bottom and the side walls of the basin 46 extend into the well 35.

Figure 4:
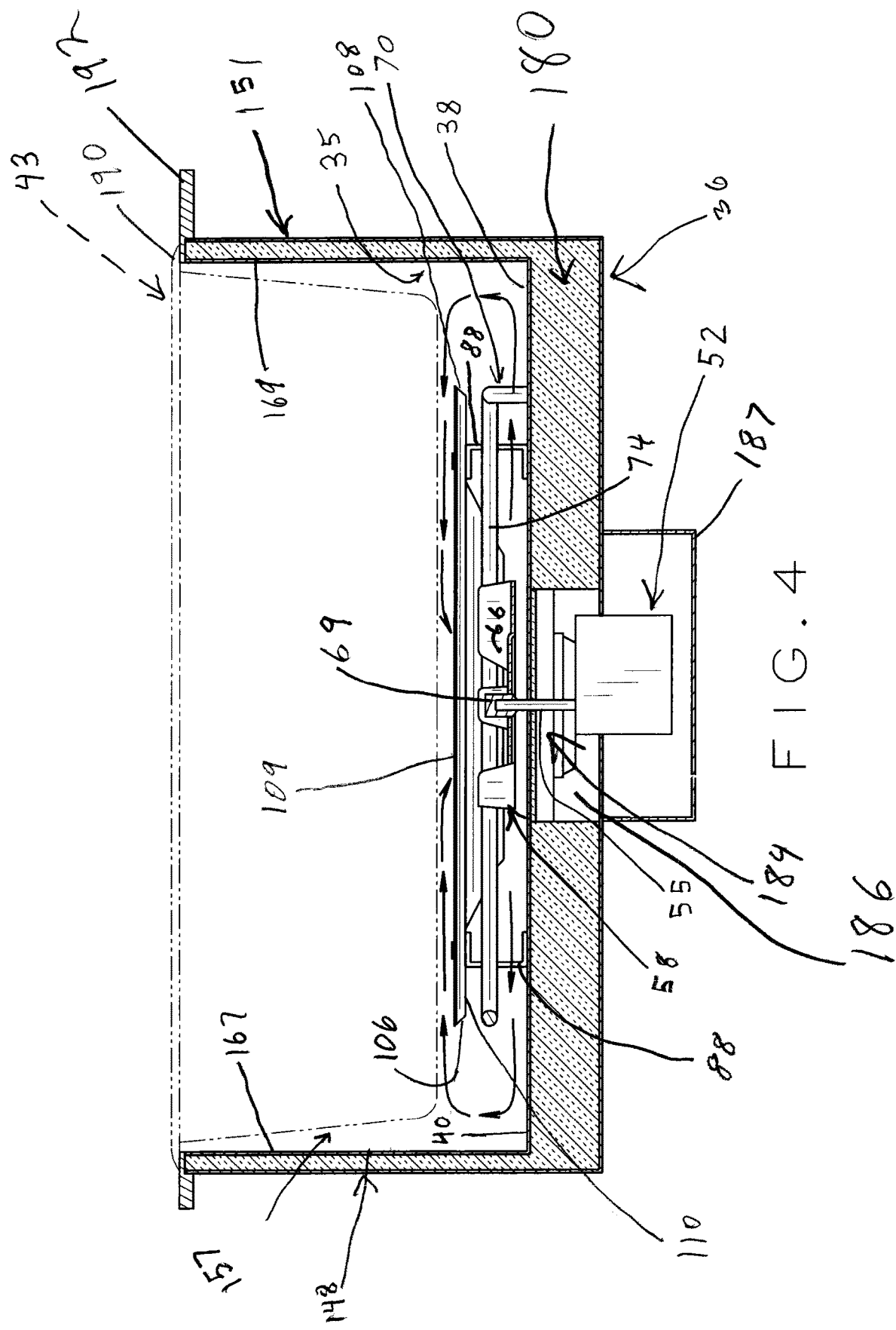
FIG. 4 is a section generally on the line 4-4 of FIG. 3, but with a built-in food warmer, with the serving pan shown in hidden lines.
Figure 5:
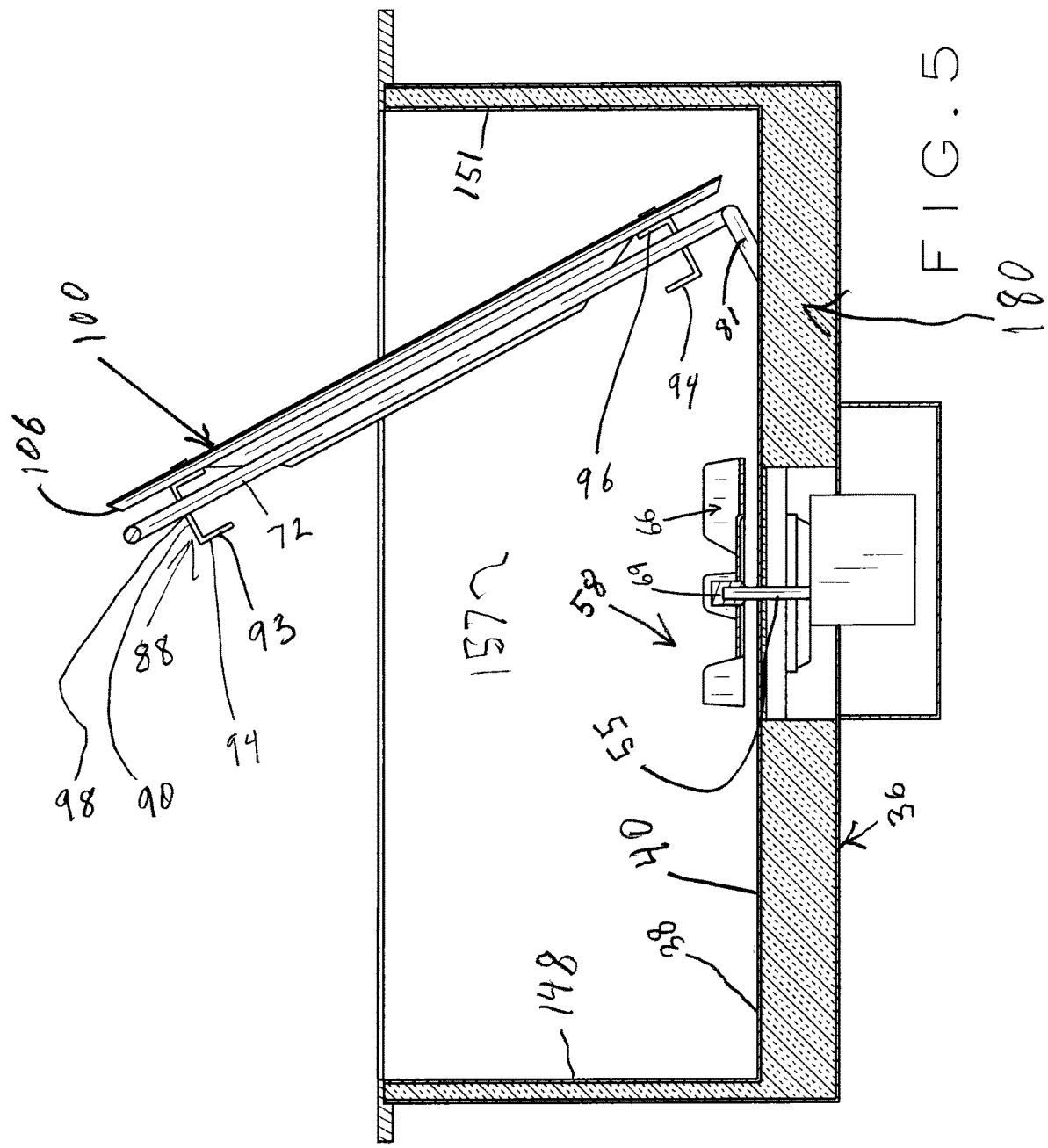
FIG. 5 is a section similar to that of FIG. 4, but with the serving pan removed from the housing, and with the heating element and baffle in raised positions.
Figure 10:
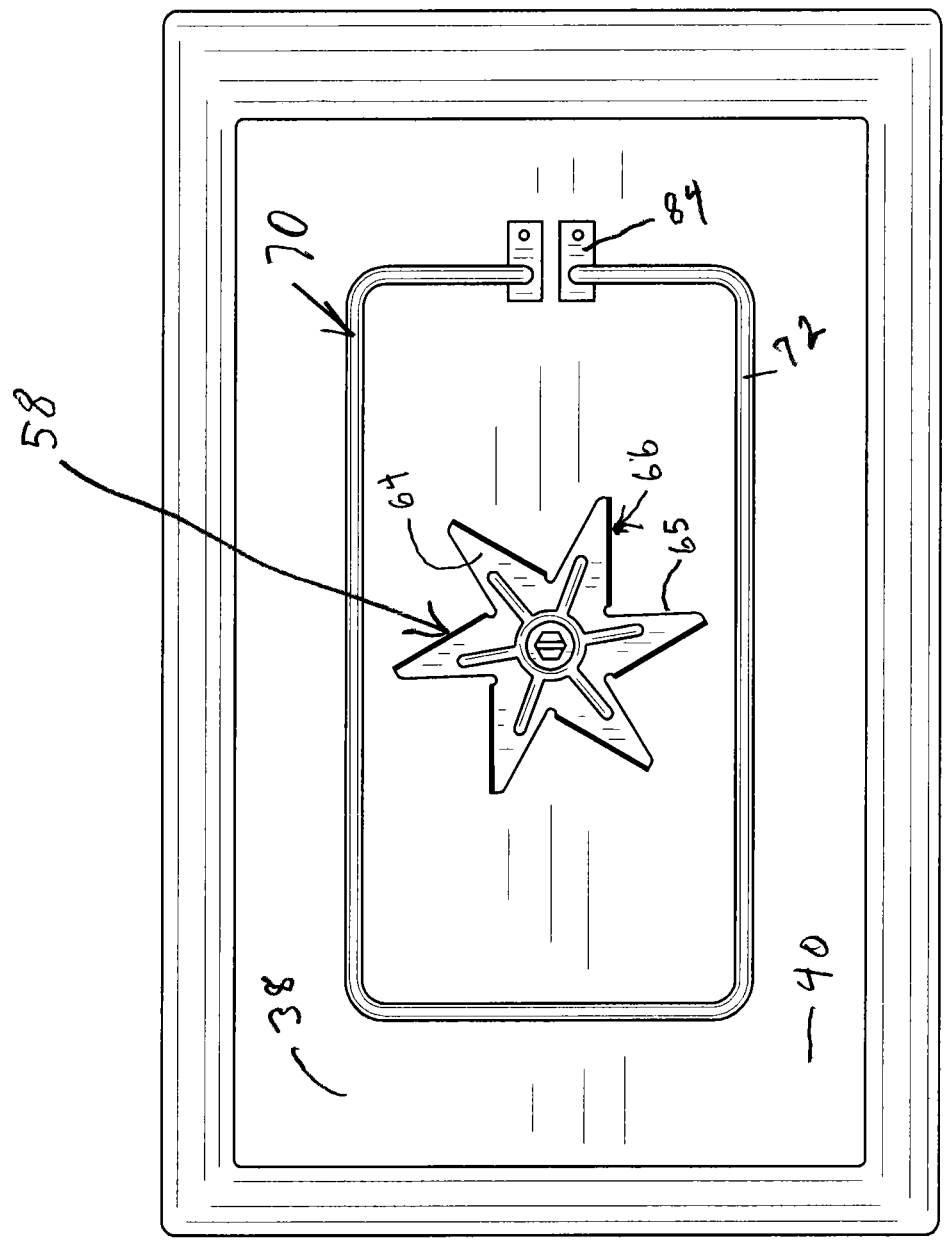
FIG. 10 is a top plan view of the housing of the assembly for a built-in type food warmer, with the serving pan omitted and with the baffle removed from the heating element.
Figure 12:
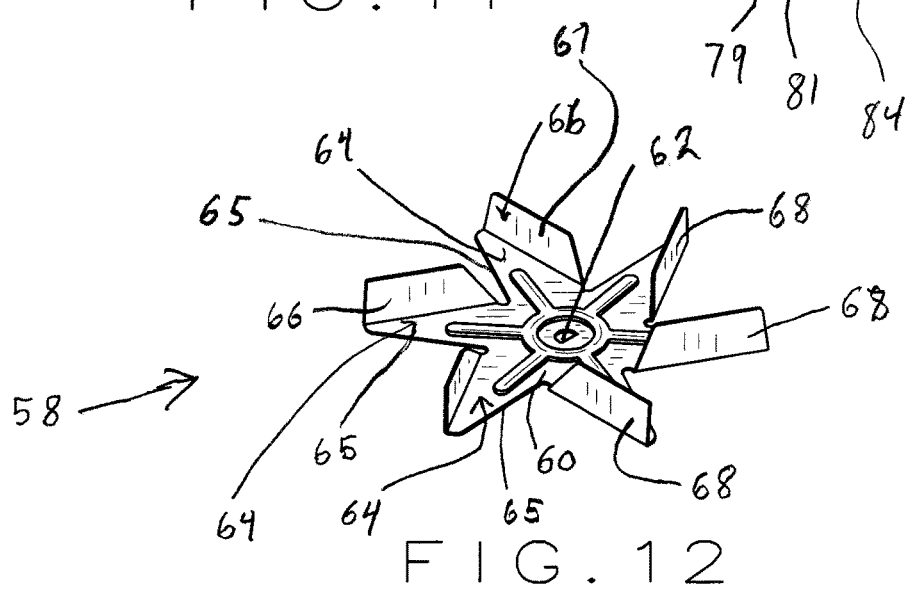
FIG. 12 is an isolated isometric view of the blower.

As seen generally in FIGS. 2-4, a motor 52 is mounted to the bottom of the housing 32 so that its shaft 55 extends vertically through the well floor layer 38 into the well 35. A blower 58 is mounted to the motor shaft 55 to be drivingly rotated therewith. Blower 58 rotates about a generally vertical axis that is generally perpendicular to the well floor layer 38 such that the blower or fan rotates in a generally horizontal orientation relative to the well floor layer 38 so as to force air outwardly of the blower in a generally horizontal direction. The blower is positioned above the floor layer's upper surface 40. As seen in its isolated view of FIG. 12, blower 58, when mounted on vertical shaft 55, has a generally horizontal base 60 through which an opening 62 extends for receiving the shaft 55. The blower base 60 has a plurality (e.g., six) of radially extending arms 64. Each arm 64 has a generally horizontal portion extending radially outwardly from base 60 and has a side edge 65 that is generally straight. At the other side of each arm 64, a vertical blade 66 extends upwardly generally perpendicular relative to the horizontal portion of its corresponding arm 64 as well as to well floor layer 38. Blade 66 is generally flat and has an inside surface 67 and an outside surface 68. The angle between the arm edge 65 and the blade 66 is about 30 degrees as shown in the drawings, and preferably between about 15 degrees to about 45 degrees depending on the number of blades on the blower. The angle between a blade 66 and the edge 65 of an adjacent arm 64 to the counter-clockwise direction of such blade 66, as viewed looking at FIGS. 10 and 12, is about 85 degrees and preferably between about 75 degrees to about 110 degrees depending on the number of blades and arms on the blower. Such spacing of the blade 66 relative to the edge 65 of such an adjacent arm 64 allows the blade's outer surface 68 to push air outwardly in a direction that is not directly against the inside blade surface 67 to thus allow for greater air velocity propelling from the blade 66 in an outward direction toward the well walls. A fitting 69 covers the end of shaft 55.

Figure 11:
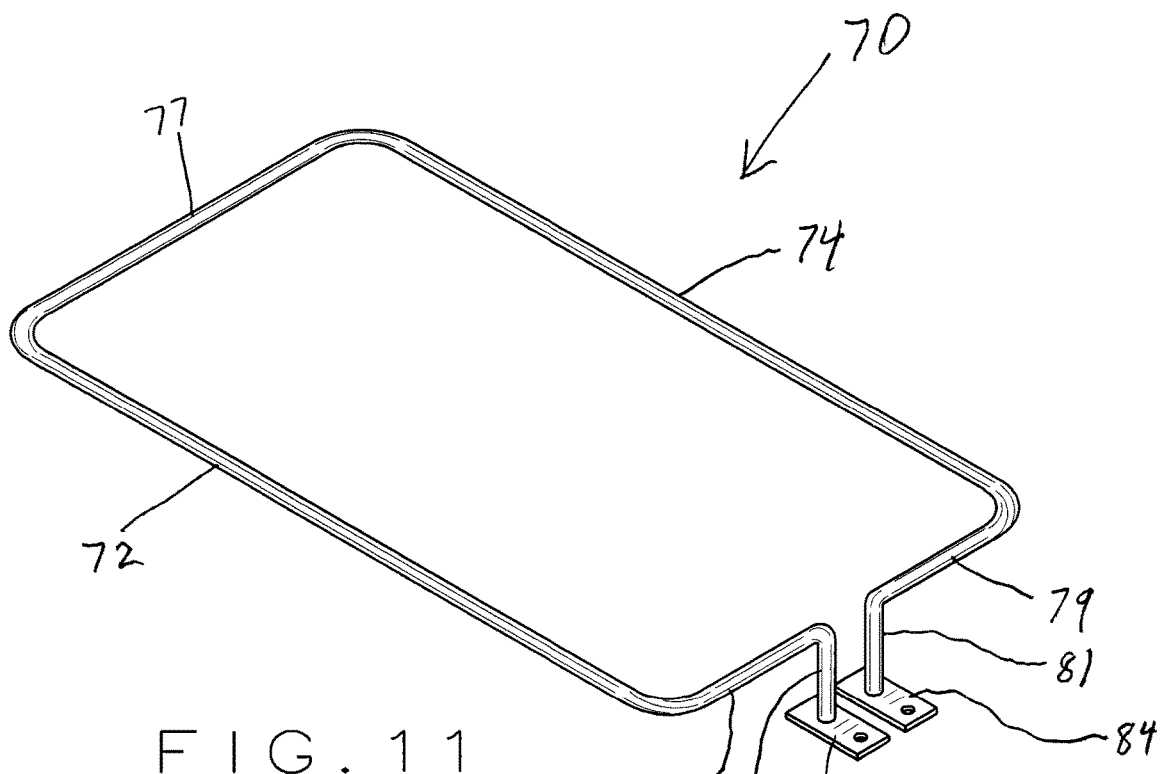
FIG. 11 is an isolated isometric view of the heating element.

A heating element 70, as best shown in FIGS. 10 and 11, has two longitudinal and generally parallel side rod sections 72 and 74 connected at one end thereof to the ends of a transverse rod section 77. At the other end of heating element 70, longitudinal rod sections 72 and 74 each bend into an end rod section 79. Each section 79 at its ends bends downwardly into a leg 81. Each leg 81 has a foot 84 that is generally flat and which is connected to the floor wall 38. Sections 72, 74, 77 and 79 of heating element 70 are generally oriented in a plane that is generally parallel to the well floor layer's upper surface 40. As shown in FIGS. 2 and 10, blower 58 is located generally centrally within heating element 70 between the longitudinal heating element sections 72, 74 and between the transverse element sections 77, 79.

The heating element 70 can have other configurations, for example, circular, oval or rectangular, but it is generally positioned relative to blower 58 so that the blower 58 is centered within the heating element configuration to allow the rotating blower blades 66 to force air across the heating element 70. This forced air in turn transfers heat to the inset pans thus heating the food product contained within them.

In addition, the heating element 70 can be mounted in such a way as to pivot upwardly to allow for access to the well bottom wall liner upper surface 40 below it, and to allow for cleaning. The elements attaching feet 84 can be mounted either to a hinged mechanism or made of spring steel, so as to bend as element 70 is lifted, but to return to its original position once released.

There is disclosed a mounting system to support the heating element 70 to elevate its rod sections 72, 74, 77 and 79 above the well floor surface 40. Rod sections 72, 74, 77 and 79 extend generally in a plane parallel to floor surface 40. There are disclosed four brackets 88 of generally a channel shape. Each bracket 88 has a generally vertically oriented midsection 90, and a lower foot section 93 which has a lower surface 94 that extends generally parallel to floor surface 40 to rest thereon. Each bracket 88 also has an upper arm 96 which has a bore extending there through to receive a screw for holding a baffle to be described. Each bracket's midsection 90 has a generally circular bore 98 extending there through. A pair of the brackets 88 thus supports heating element rod section 74 by virtue of the rod section 74 passing through the bores 98 of a pair of brackets 88, as seen in FIG. 4. Rod section 72 is likewise supported by a pair of the brackets 88.

A baffle plate 100 is shown isolated in FIGS. 6-9. As depicted in FIGS. 1-5, baffle 100 can be mounted to be positioned above well floor surface 40 and above heating element 70. Baffle 100 has a generally rectangular configuration. In the preferred embodiment, baffle 100 is illustrated as being made of a single piece of material, preferably of stainless steel with openings formed therein as by stamping. Baffle 100 generally has an upper facing surface 109 and a lower facing surface 110.

Baffle 100 has a pair of longitudinal outer edges 102 and 104, and a pair of transverse end edges 106 and 108. Centrally located in baffle 100 is a plurality of intake openings 112. The intake openings 112 preferably are located to cover an area above blower 58, which area generally overlays the circular span of rotation of the blower 58. Of that area above the rotation span of blower 58, a large percent of preferably 85 percent to about 98 percent is preferably open by virtue of the intake openings 112. In the preferred embodiment illustrated, the intake openings 112 are illustrated as a generally oblong shape and arranged in five rows. The longer sides of the oblong openings 112 are generally in alignment with the longer longitudinal baffle edges 102 and 104. Each intake opening 112 is preferably sized so that a human finger cannot pass there through and contact a moving blower 58. Thus the use of the smaller openings 112 for the area of the baffle 100 located directly above blower 58 acts as a protective safety guard to prevent injury to an operator. As discussed hereafter, alternative arrangements for intake openings can be provided. In each instance of other arrangements, the openings should be small enough to prevent insertion of a human finger, but have enough material about them to be strong enough to withstand the force of a human hand breaking the baffle in the area of the openings to allow the hand to pass through the baffle 100 to contact the blower 58. Additionally a large opening can be provided above the blower with a grid of wires or screen secured as by spot welding. The percent of open space for the plurality of openings is based on what amount of structure in the open area is need to resist movement of the hand or fingers through the open area to contact the blower.

The baffle 100 additionally has, in a preferred embodiment, four generally rectangular openings 118, 120, 123 and 126. The openings 118, 120, 123 and 126 are large enough so that a human finger can pass there through. Therefore such larger openings are preferably located in an area of the baffle 100 so as not to overlie any part of the blower 58 to avoid inadvertent injury to an operator.

Figure 6:
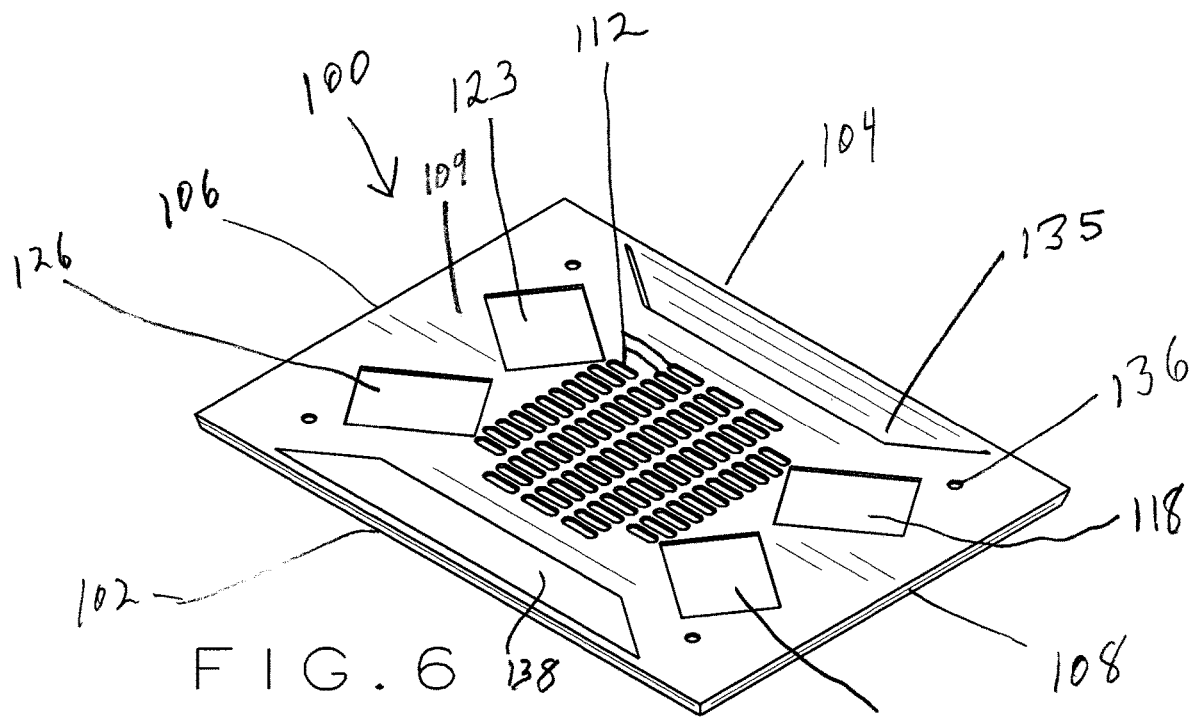
FIG. 6 is an isolated isometric view of the baffle.
Figure 7:
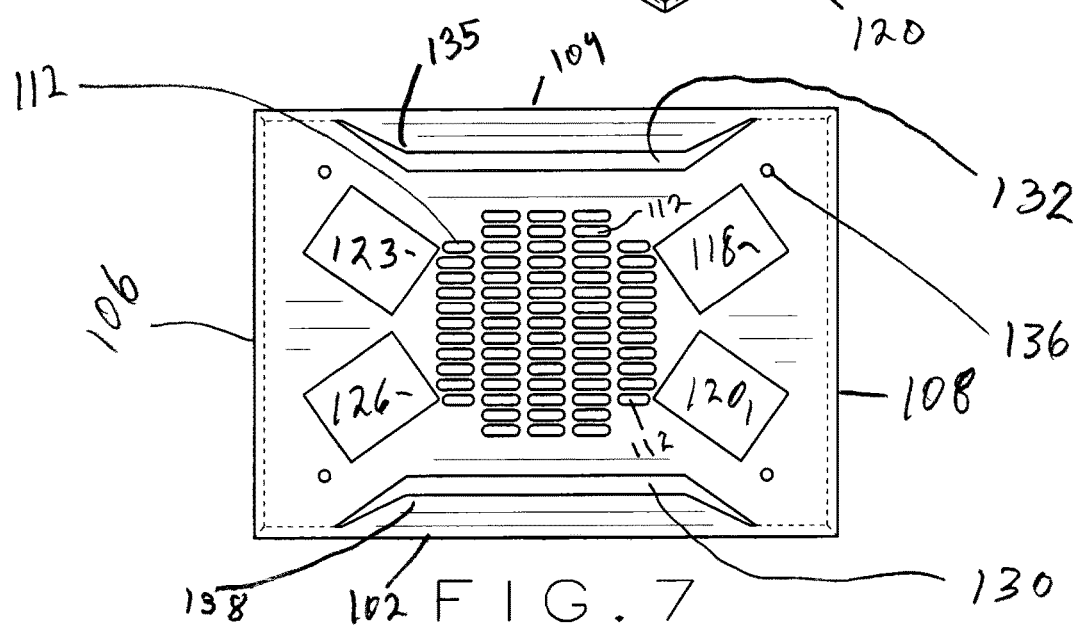
FIG. 7 is an isolated top plan view of the baffle.
Figure 8:
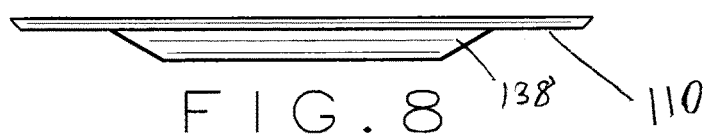
FIG. 8 is an elevation from the perspective viewing the longitudinal edge of the baffle of FIG. 7.
Figure 9:
FIG. 9 is an elevation from the perspective of the right end of the baffle of FIG. 7.

Additionally, the baffle 100 has a pair of longitudinal vaned passageway holes 130 and 132 (FIGS. 6-7). Each passageway hole 130 and 132 is formed with a downwardly extending vane 135 and 138, respectively, preferably formed to be unitary with baffle 100. Each vane 135 and 138 extends downwardly at an angle towards the inside of the well 35. As seen FIG. 8, the vanes 135 and 138 are generally of a trapezoidal shape, and act to turn air from blower 58 in an upward direction. Each of the holes 130 and 132 are preferably large enough so that a human finger can extend there through. Each of the holes 130 and 132 are spaced in an area of the baffle 100 so that they do not overlie the blower 58 to thus avoid possible injury by an operator's fingers coming into contact with blower 58. Each of the openings 130 and 132 is preferably located generally directly above its respective heating element rod segments 72 and 74.

Baffle 100 in FIG. 2 is shown to have four apertures 136 extending there through, which are aligned so that each of four screws 142 can extend there through and through openings in upper bracket arms 96, to secure baffle 100 to brackets 88. Wing nuts and belts can also be used for such purpose. However, the preferred method is by mounting brackets having a shoulder mounting stud with an enlarged head that fits through and slides within keyhole slots as later described herein.

The frame 34 has end walls 148 and 151 and longitudinal side walls 154 and 157, which all have lining layers as will be described.

As seen in FIG. 4, when the blower 58 rotates in a clockwise direction from the perspective of FIGS. 3 and 10, its blades 66 propel air outwardly therefrom so that air passes beneath the baffle 100 to pass around the heating element 70 and be heated thereby. Such airflow includes that shown in FIG. 4 wherein the air moves toward the end walls of the well 35 beyond the baffle edges 106 and 108. The rotation of blower 58 creates a lower pressure vortex with an area in the more central section area located about the axis of shaft 55, above blower 58. The air propelled outwardly from blower 58 in the directions toward the left and right of FIG. 4 toward well walls 148 and 151, flows so that after clearing the baffle edges 106 and 108, air flows upwardly as shown by the arrows. Then the air flows inwardly over the top baffle surface 109, to thence flow through the intake openings 112 toward the central part of blower 58. Such air will the eventually move outwardly and be propelled again by the blower blades 66 in an outward direction. During such described airflow the heated air passes about the exterior surface of serving pan 43 to heat it and its contents.

Figure 13:
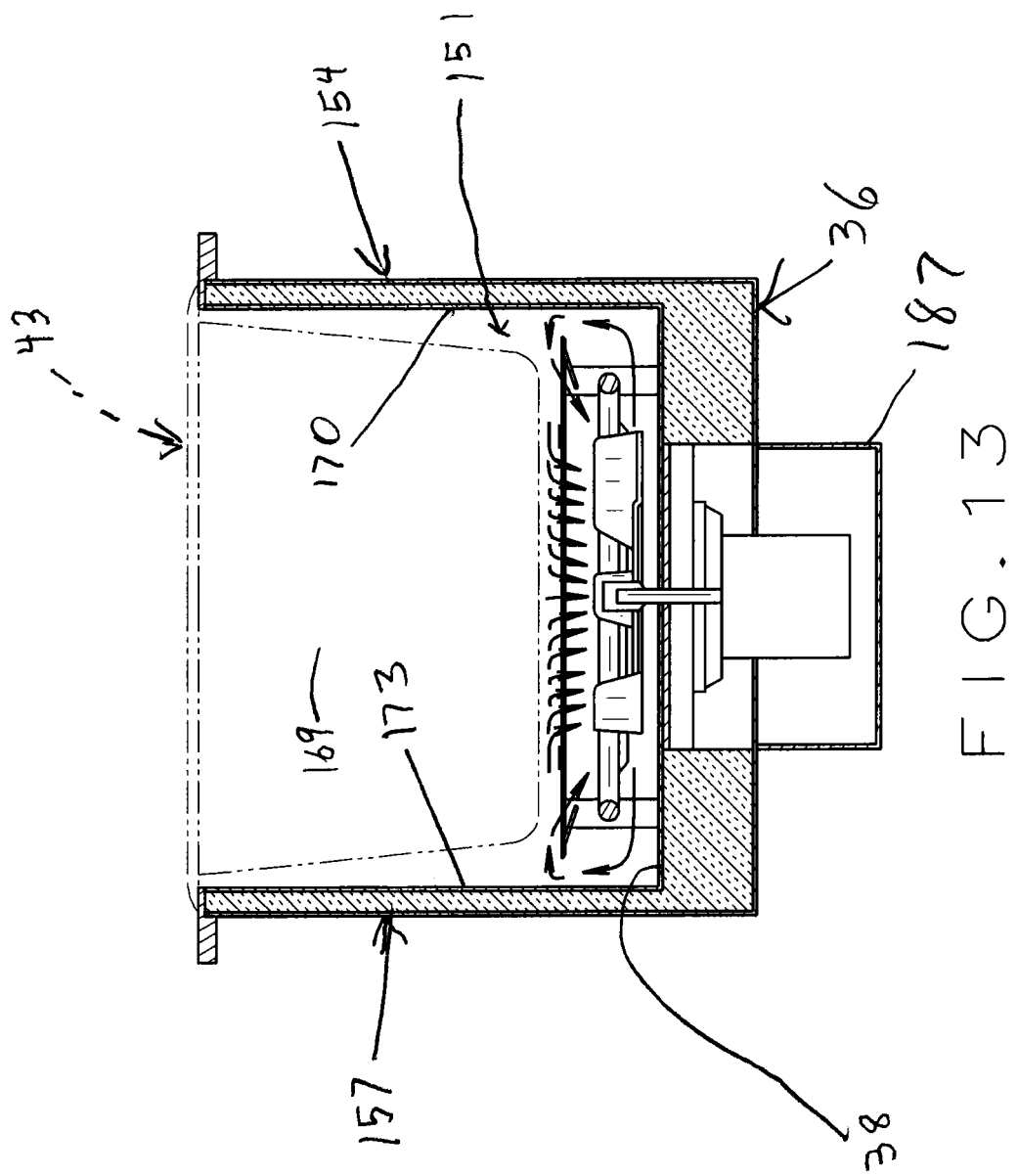
FIG. 13 is a section view taken on the line 13-13 of FIG. 3, for a built-in type food warmer, with illustrations of airflow depicted by arrows.
Figure 14:
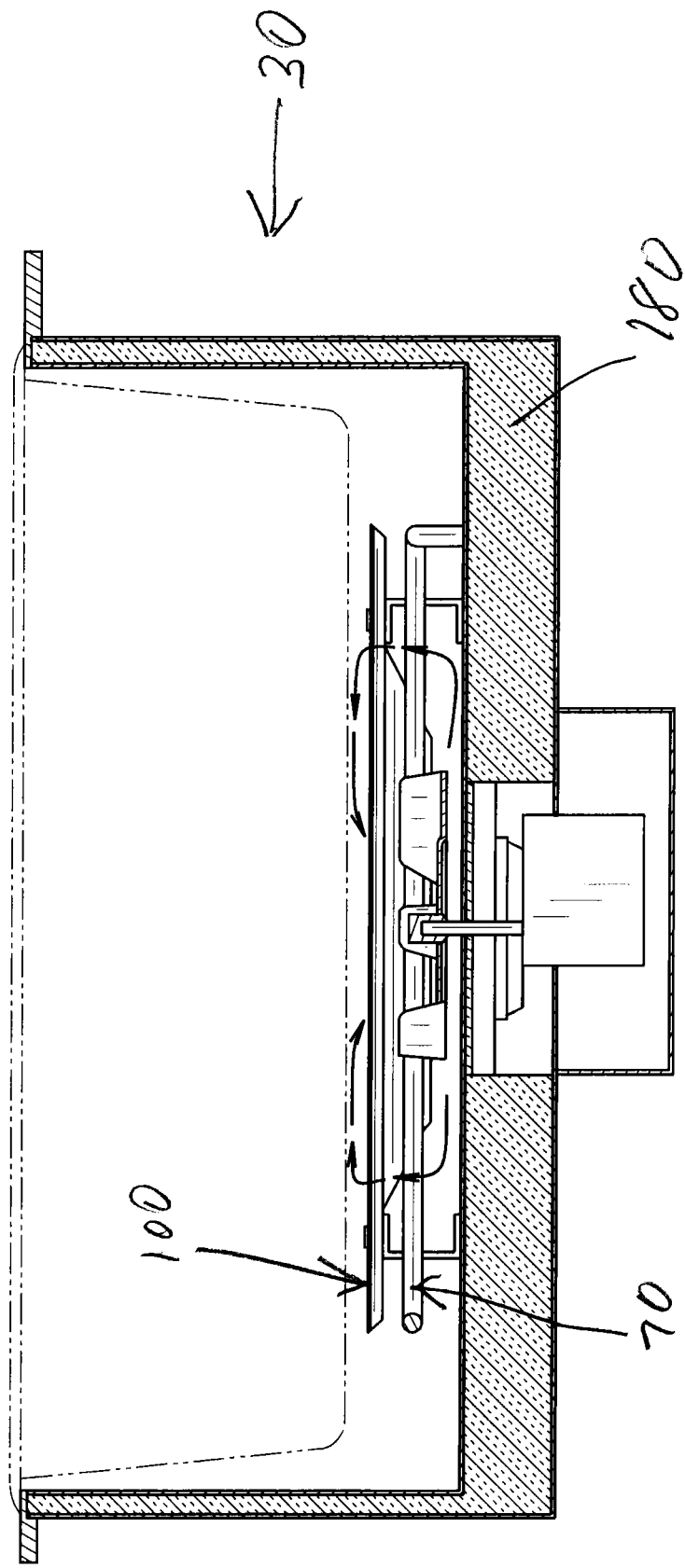
FIG. 14 is a section view taken on the line 14-14 of FIG. 3, with arrows depicting airflow.

Likewise, as depicted by the arrows shown in FIG. 13, some air directed toward the longitudinal well side walls 154 and 157 will contact the inward facing surfaces of vanes 135 and 138, to be directed upwardly through the passageway holes 130 and 132, respectively. Each of the openings 130 and 132 is located generally directly above its respective heating element rod segments 74 and 72 so that such air flows by those heating element sections to be heated. As shown specifically in FIG. 13, other of the air directed towards the well side walls 154 and 157 passes beneath the lower ends of vanes 130 and 132 and continues to move towards well side walls 154 and 157 until it passes beyond the baffle longitudinal edges 102 and 104. Such air then passes upwardly, as shown in FIG. 14, and then flows inwardly above baffle upper surface 109, to pass through the intake openings 112 toward the vortex created by blower 58, and into the space above the central portion of blower 58. During such airflow heated air also heats the exterior surface of pan 43 to heat it and its contents.

As shown in FIG. 3, airflow is also directed through each of the larger rectangular openings 118, 120, 123 and 126 to pass above baffle 100, and thence toward and through intake openings 112 to the space above blower 58. During such airflow heated air also heats the exterior surface of pan 43 to heat it and its contents.

Further, the heated airflow directed in the direction of the well walls 148, 151, 154 and 157, moves upwardly through force convection and natural convection to the outside of the pan 43 between pan 43 and the said well walls, to heat the pan 43. Thus the system and method disclosed provides for efficient distribution of heat from heating element 70 by both the radiant heat from element 79 and through convection by distribution of air flow as described.

More Specific Disclosure of Best Mode, and Alternatives

Further, the housing walls 148, 151, 154 and 157 can be formed with an interior liner layer depicted in the drawings as 167, 169, 170 and 173, respectively. Layers 167, 169, 170 and 173 along with the floor layer 38, can be formed of unitary or integral construction. For example they can be of stainless steel formed of a single stamped sheet. The well 35 is located within the layers 148, 151, 154 and 157 and floor layer 38. The blower 58, heating element 70 and baffle 100 are all located within the well 35.

To the outside of layers 167, 169, 170, 173 and floor layer 38 can be provided insulation 180, such as known in the art. To the outside of the insulation 180 thereof are layers of exterior material which can be of stainless steel, which forms the outer layers of the side walls 148, 151, 154 and 157, and the outer layer of bottom 36.

As seen in FIGS. 4 and 13, for example, a motor mount plate 184 assembly is secured to the floor layer 38 to allow the motor 52 to be secured with the housing 32. A cavity 187 is located in the bottom wall 36 beneath floor layer 38 within the insulation 180 to receive mount plate 184 and part of the motor 52. Legs 188 can be attached to bottom wall 36 to support the housing 32. A cover 187 is releasably secured to the bottom wall 36, as by brackets and screws, to cover motor 52. The motor can, for example, be a 41-watt AC electric motor.

The angle of the vanes 135 and 138 relative to the upper surface 109 and lower surface 110 of baffle 100 in its best mode is about 45°, but can further preferably range from about 30° to about 60°. The length of the vanes 135 and 138 preferably ranges from about 2 in. to about 0.75 in. If desired, the vanes 135 and 138 can be omitted, with the openings in the same location, but it is preferred to have the vanes present in the preferred embodiment.

The blower 58 preferably has six pairs of arms 64 and blades 66. The diameter from the point of the distal tips of the arms 64 through the blower opening, is about 6 in. Blowers with more or less pairs of arms 64 and blades 66 could be used. The blower can have radially aligned ribbing in each arm 64, and intersecting circular ribbing as shown in FIGS. 10 and 12, for example.

In the preferred embodiment, the larger of the intake openings 112 can have a length of about 1 in., with the shorter of the intake openings 112 having a length of about 0.75 in. The width in the preferred embodiment for intake openings 112 is about 0.25 in. In a preferred embodiment, the openings 112 in each row are spaced from one another along their longitudinal edges by a distance by about 0.063 in. to about 0.25 in. The openings 112 in adjacent rows are spaced from the ends of openings of their adjacent rows by a distant of 0.063 in. to about 0.25 in.

The well dimensions as illustrated for the preferred embodiment are shown such as to accommodate a 12"×20"

serving pan. As known in the art, the serving pan 43 has a lip 190 that extends about the top of the perimeter of its walls 48 and 50 so that the lip 190 can rest upon a cover flange 192 mounted to the top of the housing walls 148, 151, 154 and 157. The assembly 30 can also be used in conjunction with housings of other sizes, including those known in the art which accommodate 12"×27" serving pans.

Although a single pan has been illustrated in the drawings, different pan arrangements can be used, such as those combining a single half-pan and two quarter-pans. Further, serving pans of different depths can also be used. The description of assembly 30 given for the preferred embodiment is one believed to accommodate various combinations of different numbers of pans and various pan depths, as would be expected to be encountered in using the assembly 30.

The assembly can be provided with electrical and electronic controls and circuitry operated by a knob 198, to provide infinity electrical control for heating the heating element 70. The assembly can also be controlled be a thermostat using an electronic printed circuit control board with a digital display.

Figure 15:
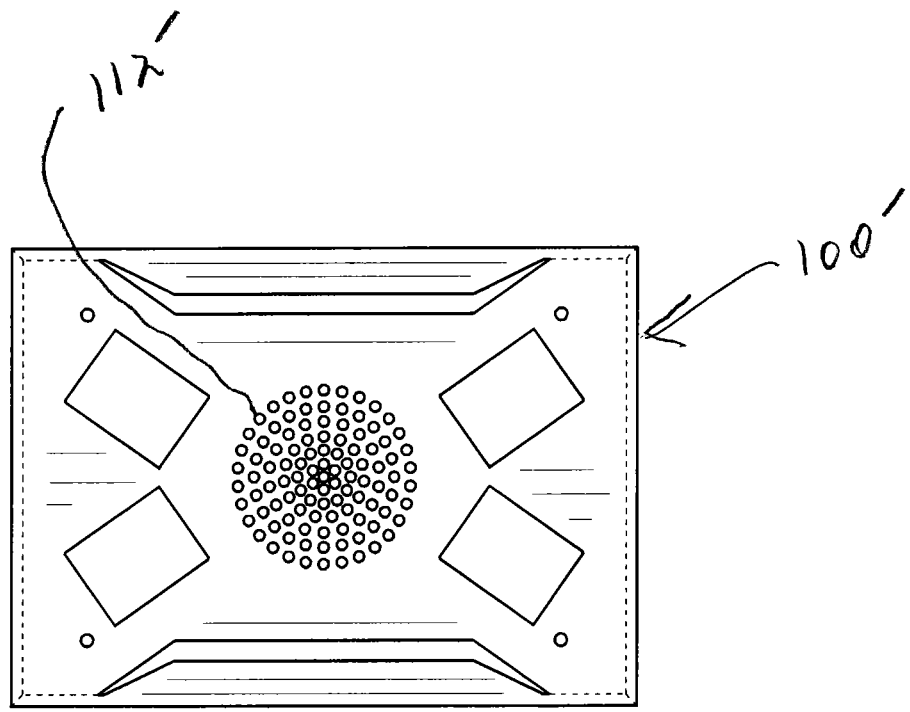
FIG. 15 is a top plan view of another embodiment of the baffle, showing a pattern of circular holes arranged in a circular fashion in a position above the blower.

FIG. 15 shows an alternative embodiment of the baffle 100'. Baffle 100' differs from the embodiment of FIGS. 1-14 in that the intake openings 112' are arranged in a circular pattern above the blower with the intake openings 112' have a generally circular shape. The intake openings 112' are sized so that a human finger cannot pass there through and come into contact with the blower there beneath. Thus this pattern of FIG. 15 also provides a safety guard from injury to an operator.

Figure 16:
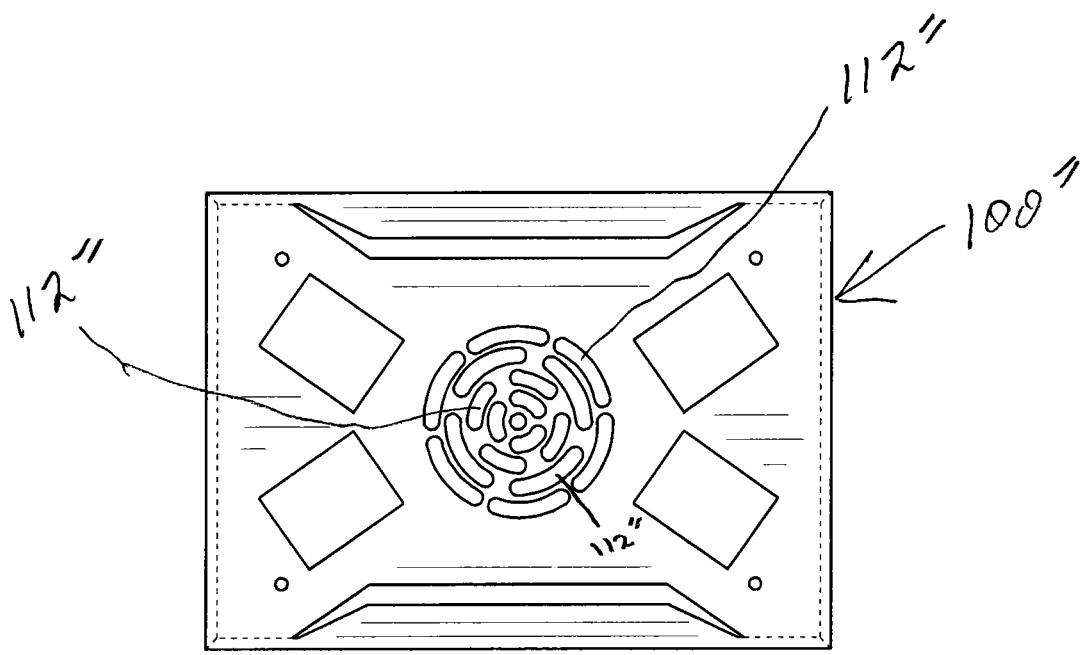
FIG. 16 is another alternative embodiment of the baffle, depicting arcuate shaped openings in a circular pattern located above the blower.

FIG. 16 shows a further alternative embodiment of the baffle 100". In this embodiment a plurality of intake openings 112" are arranged in a circular pattern above the blower. The intake openings 112" are generally of an arcuate configuration with the length of arcuate openings decreasing from the outer circumference of the arrangement towards the center thereof. The center opening is of a circular shape.

In the embodiment of FIGS. 17-20, a pair of longitudinal vaned passageway holes 130''' and 132''' as with baffle 100 of FIGS. 6-7, has a downwardly extending vane 135''' and 138''', respectively, preferably unitary with baffle 100''' and extends downwardly at an angle towards the inside of the well 35, with preferably the same configuration, location and angles as stated for baffle 100.

Baffle 100''' like the embodiment of FIGS. 1-14, also has an array of smaller central openings 112''' shaped and configured in an arrangement as shown for the intake openings 112.

Figure 17:
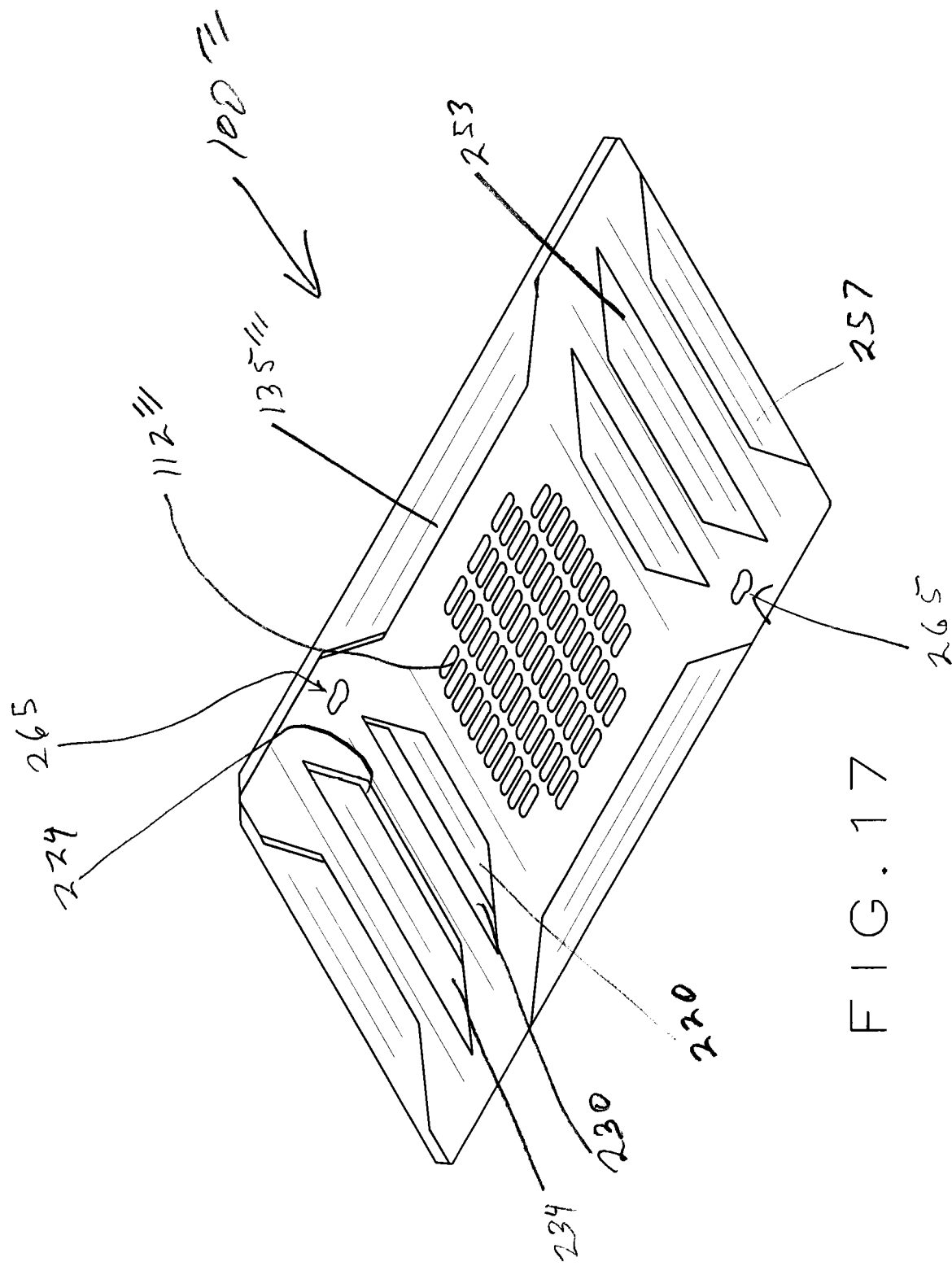
FIG. 17 is isometric view of yet another embodiment of the baffle showing transversely oriented vaned passageway openings as well as longitudinal vaned passageway openings.
Figure 18:
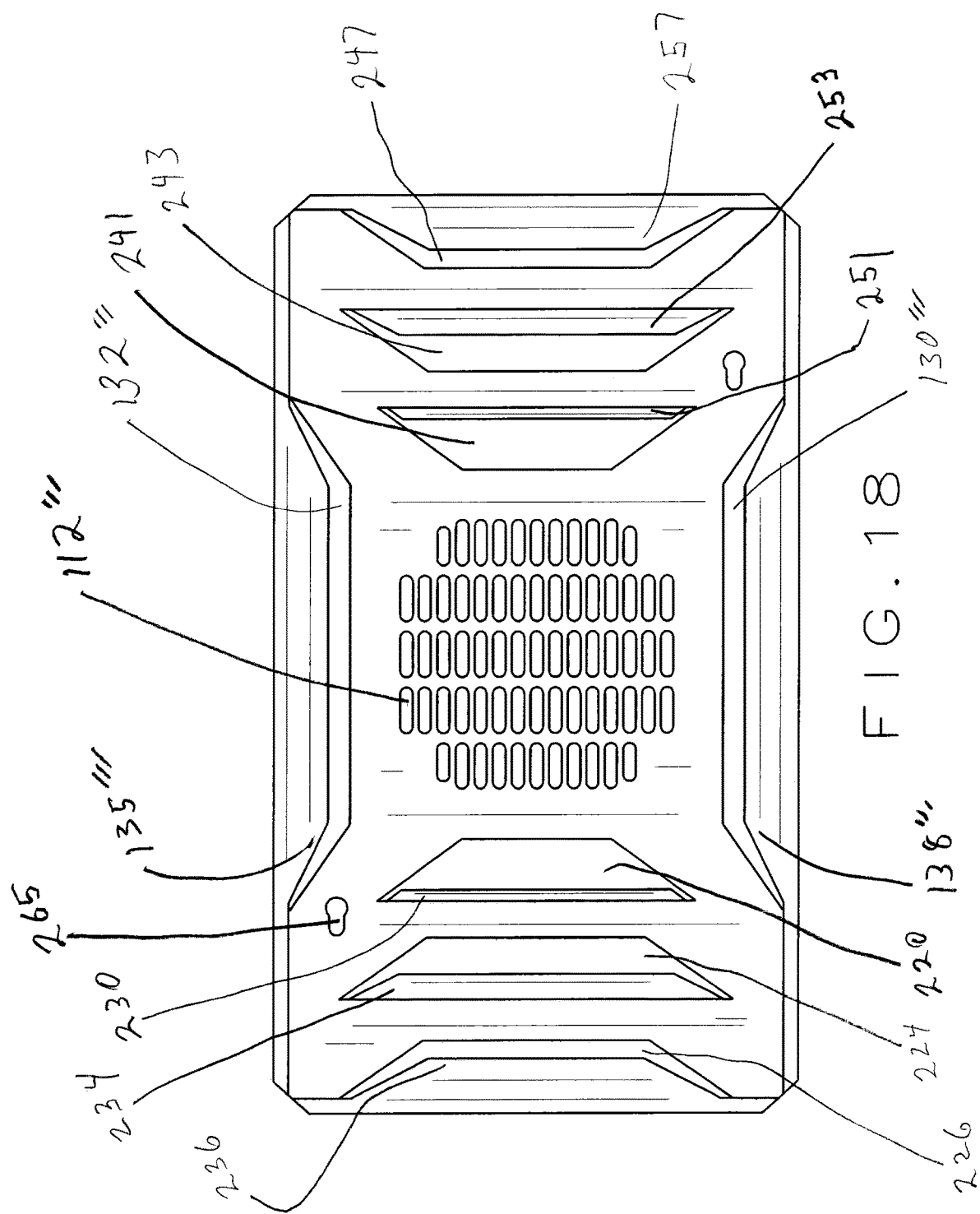
FIG. 18 is a top plan view of the baffle of FIG. 17.
Figure 23:
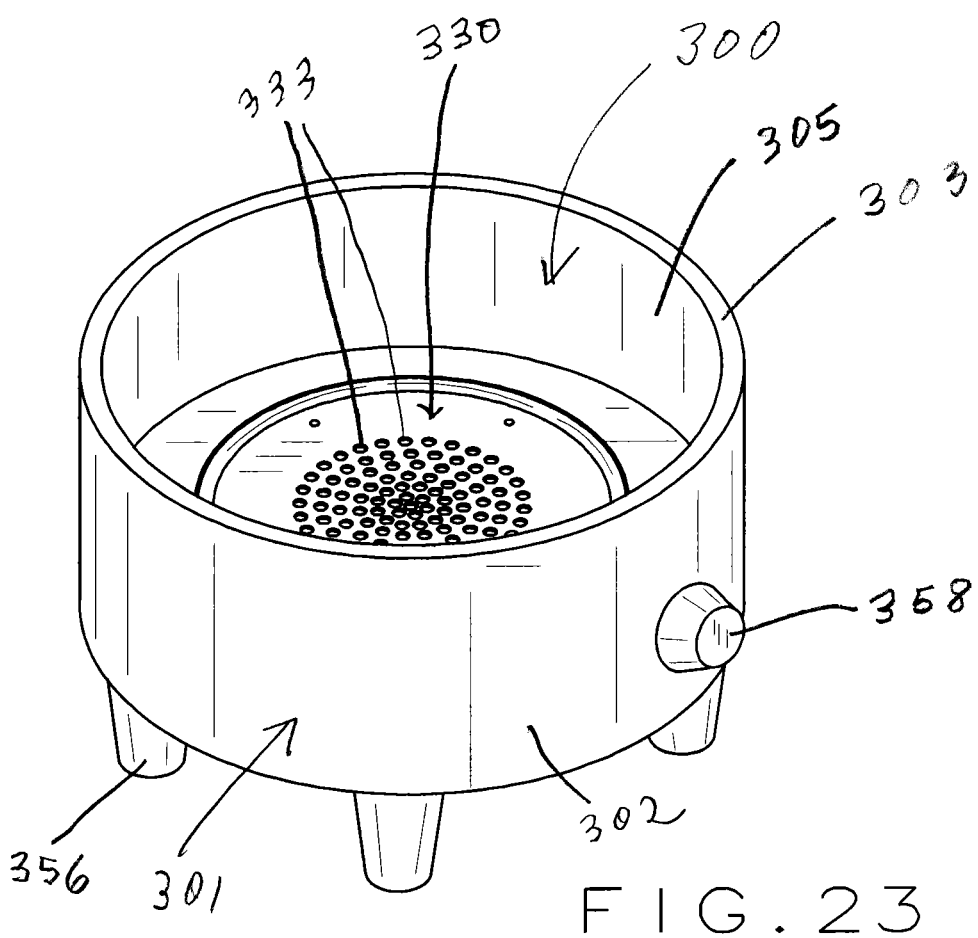
FIG. 23 is isometric view of a cylindrical dry well convection food warmer assembly with the serving pan shown removed.
Figure 25:
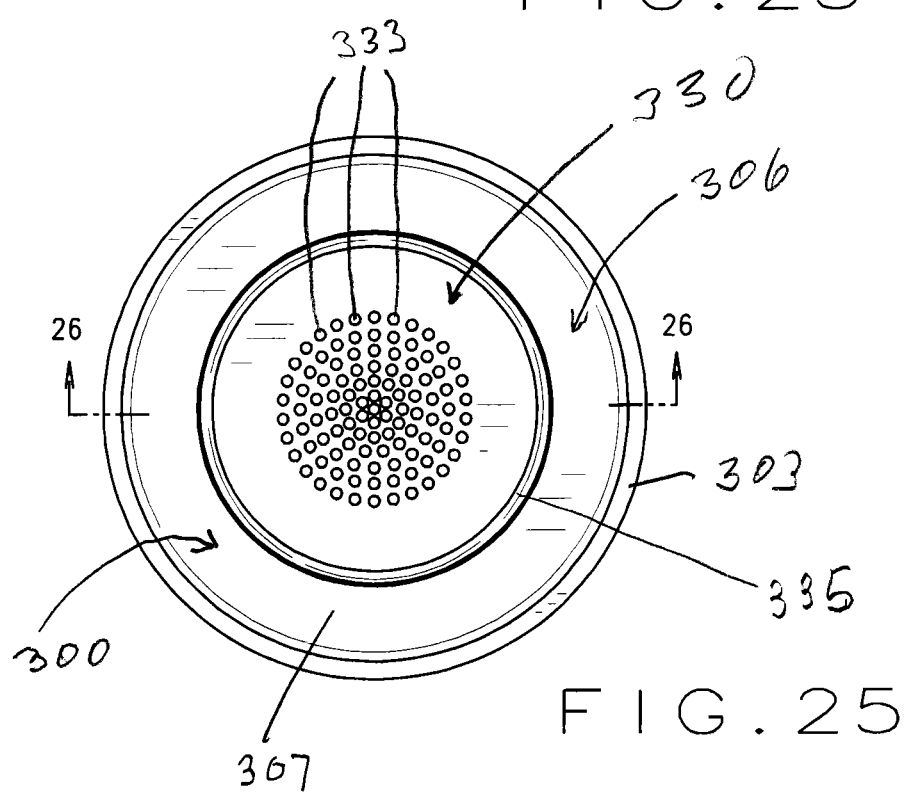
FIG. 25 is top plan view of the assembly of FIG. 23 with the serving pan omitted and not showing the control dial.
Figure 24:
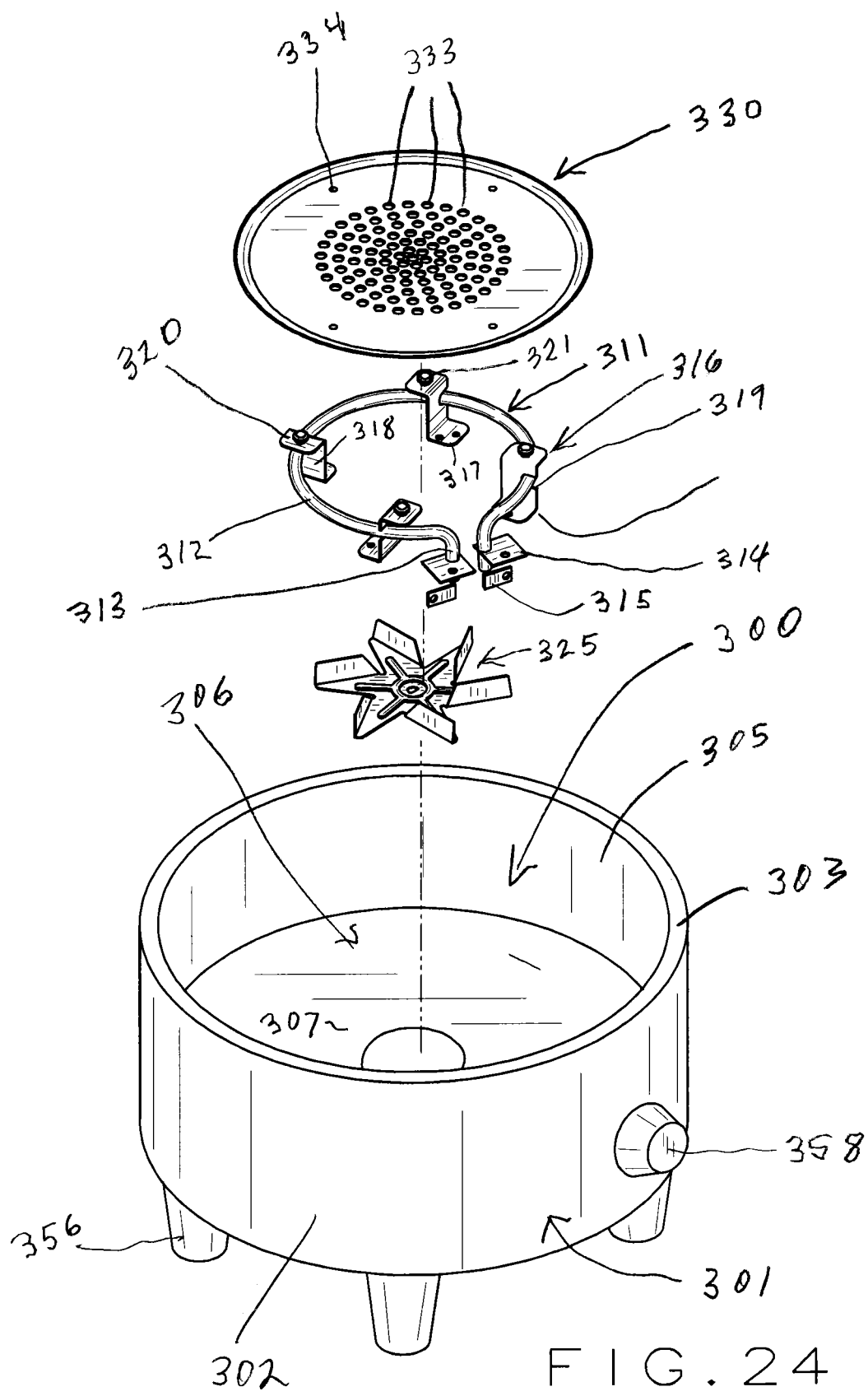
FIG. 24 is an exploded isometric view of a cylindrical dry well convection food warmer assembly of FIG. 23, with the serving pan omitted for clarity, and with the blower, heating element, baffle and brackets exploded from the housing.

To the left side of baffle 100''' as seen from the perspective of FIGS. 17 and 18, baffle 100''' has three transverse vaned passageway holes 220, 224 and 226, each with a corresponding downwardly extending vane 230, 234 and 236, respectively, preferably unitary with baffle 100'''. Each of the vanes 230, 234 and 236 and extends downwardly at an angle towards the inside of the well.

To the right side of baffle 100''' are three transverse vaned passageway holes 241, 243 and 247, each with a corresponding downwardly extending vane 251, 253 and 257, respectively, which extend downwardly at an angle towards the inside of the well, and are preferably unitary with baffle 100'''.

The angles of the vanes 230, 234, 236, 251, 253 and 257 relative to the upper surface 109 and lower surface 110 of baffle 100 in best mode is about 45°, but can further preferably range from about 30° to about 60°. However the lengths of each of the vanes vary from the inside to the outside.

In FIG. 18, the length of each vane 230 and 251, 234 and 253 and 236 and 257 is relevant to air flow in the longitudinal direction. As one progresses from inner vane to outer vane, the vane length must become increasingly longer. The inner vanes are designed to capture some of the air flow and direct it upward, and let some of the air flow pass that vane to the next vane location. The middle vane location will then capture some of the excess airflow that passes the inner vane and direct it upward and let some airflow pass to the outer vane location and so forth. This progression of airflow better allows the air to be heated evenly as it circulates and is directed by the vanes to the underside of the serving pans, thus heating the food product contained within through convection heat. The inner vanes 230 and 251 locations openings 220 and 241 can preferably range from about 4 in. to about 6 in. length and about 1.25 in. to about 2.0 in. in width, with the length of inner vanes 230 and 251 preferably ranging from about 0.25 in. to about 0.375 in. The middle vane openings 224 and 243 can preferably range from about 6 in. about 8 in. length and about 1.25 in. to about 2.0 in. in width, with the vanes 234 and 253 length preferably ranging from about 0.50 in. to about 1.0 in. Each outer vane's opening 226 and 247 can preferably range from about 6 in. to about 8 in. length and about 1.25 in. to about 2.0 in. in width, with the length of each vane 236 and 257 preferably ranging from about 1.25 to about 2.0 in.

This progressive vane depth baffle design in place of the square openings (118, 120, 123, and 126) shown in FIGS. 6 and 7 directs and captures more air to the underside of the serving pans.

The baffle 100''' is also mounted differently than shown in FIGS. 1-14. The preferred way of mounting for both the baffle 100 design, and as illustrated in FIGS. 17-20, is by keyhole slots 265 being formed in the baffle 100''', as by stamping, with the mounting brackets receiving through bores in their shoulders the shaft of a mounting stud 267 with an enlarged head 270. The head is sized to pass through the large section of keyhole 265 so that the baffle can slide so that the stud shaft fits with the smaller section of the keyhole 265.

Yet another alternative embodiment is shown in FIGS. 23-26. In this embodiment the assembly has a well 300 supported in a countertop type housing 301 of a cylindrical shape with a circular outer wall layer 302. The top of the wall 302 has an upper annular shaped upper shoulder surface 303. Well 300 has a cylindrical wall layer 305 that continuously extends into a circular bottom wall 306 with an upper floor surface 307. The serving pan 308 has an upper outwardly extending lip 309 that can rest on shoulder 303 or upon the flange of a built-in type as shown in FIG. 26. A circular heating element 311 is mounted above bottom wall 306. Heating element 311 has a generally circular section 312 that at its ends extends downwardly into a pair of generally vertical legs 313 each of which has a foot 314 that is generally flat and which is connected to the floor wall 306. The wires of the element 311 are connected to terminal plates 315. Mounting brackets 316 have flat feet 317 that rest on the floor surface 307 or can be affixed thereto as by screws. Brackets 316 have a vertical middle section 318 that has an open slot 319 that receives the circular section of element 311 to support it above well floor surface 307. Each bracket 316 has a generally flat horizontal arm 320 with a bore that receives the shaft of a stud 321 so that the stud head extends above arm 320.

A blower 325 is positioned within the circular part of element 311. Blower 325 preferably has the same general configuration as blower 58. A generally circular baffle 330 has a plurality of smaller intake openings 333 centrally dispersed in a central location with an outer perimeter of a circumferential shape of preferably a diameter of 4.0 in. that generally overlies the area of rotation of blower 325. Baffle 330 is located above the heating element circular section 312. Baffle 330 has four bores 334 that can be aligned for mounting with the studs 321 and bracket arms 320, and can also have the keyhole design of FIGS. 21-22. The planes of the heating element circular section 312, the baffle 330, the blower 325 and the well floor surface 307, are generally parallel to one another. The baffle 330 has about its circumference an upwardly turned lip 335 that helps to turn air blown by blower 325 in an upwardly direction. In this instance the inside diameter of well 300 is about 10.356 in. The blower 325 has a diameter of about 4.0 in. while the diameter of the baffle is preferably about 6.0 in. The outer edge of the circular part of the heating element 311 is located about 2 in. from the inside surface of well wall layer 305. A motor 344 is mounted beneath well bottom wall 306 and has a shaft 345 that extends through wall 306 to be in driving connection with a bore centrally located in blower 325.

The blower 325 blows air outwardly such as described for blower 58, to direct air about the heating element 311 to be heated thereby. As seen in FIG. 26, the heated air passes toward well wall layer 305 and turns upwardly about the outer baffle lip 335 and thence turns above the top of baffle 330 to pass toward the central area of baffle 330 thence through the intake openings 333 to the inner section of the blower 325. The convection flow pattern circulates heated air about the underside of the cylindrical serving plan 308 as it rests atop well 300 to warm food contained therein.

As with the first embodiment, insulation 350 can be provided between the well inner wall layer 305 and outer housing wall layer 302. A cover 353 can fit about motor 344 and legs 356 can be provided for the housing along with a knob 358 for controlling the heating element.

Figure 27:
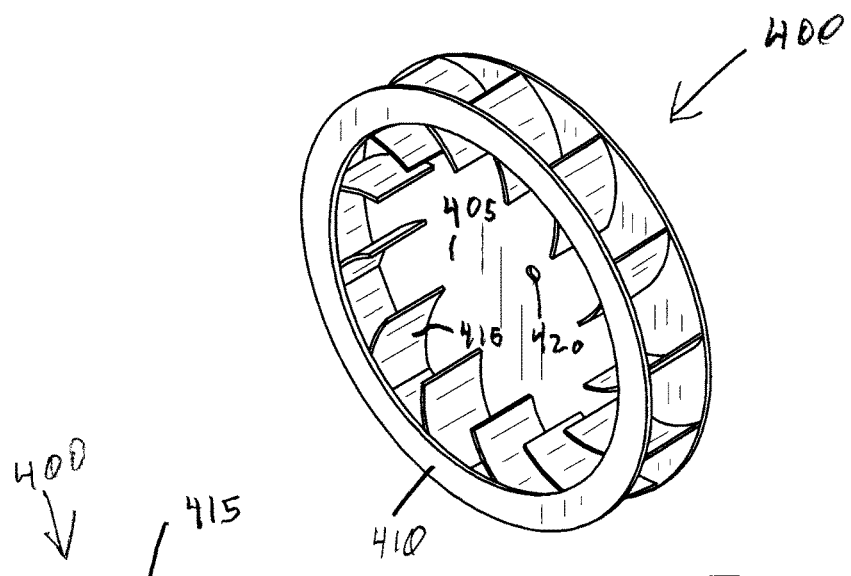
FIG. 27 is an isometric view of an alternative blower.
Figure 28:
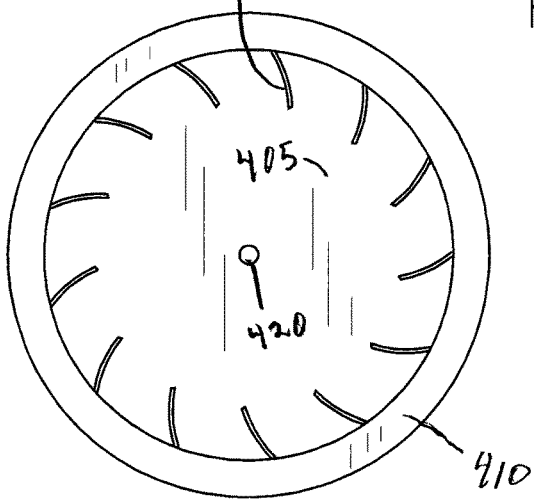
FIG. 28 is a side elevation looking at the open side of the blower of FIG. 27.
Figure 29:
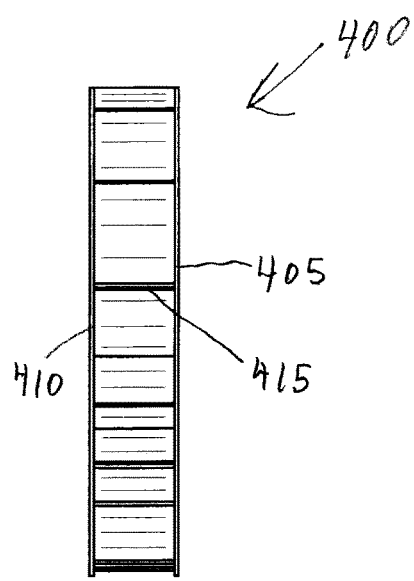
FIG. 29 is and end elevation looking at the right side of the blower shown in FIG. 28.

As a modification to the blower 58, a squirrel cage type blower 400 such as shown in FIGS. 27-29 can be substituted. Blower 400 has a circular shaped plate 405 and an annular shaped plate 410, with curved blades 415 having their outer edges secured there between. Plate 405 has a central bore 420 for receiving the motor shaft. Blower 400 can be used to propel air for circulation as describe. However the blower having the configuration of that shown for blower 58 is considered preferable over the type of blower depicted in FIGS. 27-29.

In view of the above, it will be seen that advantages of the invention are achieved and advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A dry well food warmer assembly for warming food located within a serving pan, comprising:
   a housing forming a well including a bottom wall with a well floor extending in a generally horizontal plane, and a well outer wall structure located upwardly of the bottom wall, wherein the serving pan includes a closed bottom and a side wall, which are configured to define a closed heating space with the well floor and the well outer wall structure;
   a heating element configured to heat air and mounted within the well, wherein the heating element is arranged in the closed heating space and generally oriented in a plane that is generally parallel to the well floor;
   a blower rotatably mounted relative to the well to rotate about a generally vertical axis that is generally perpendicular to the well floor, the blower having a plurality of blades to blow air outwardly from the blower toward the heating element and the well outer wall structure such that the heated air circulates within the closed heating space; and
   a baffle mounted within the well and arranged in the closed heating space, the baffle generally extending in a generally horizontal plane generally parallel to the well floor and generally parallel to and above the plane of the heating element; the baffle generally having an upper side and a lower side, the baffle having one or more outlet openings that are configured when said food warmer assembly is in operation to allow air that has been heated by the heater to flow from beneath the lower side of the baffle to above the upper side of the baffle so as to heat at least the closed bottom of the serving pan,
   wherein the closed bottom of the serving pan is installed in the well and configured to reflect the heated air such that the heated air is isolated and circulates within the closed heating space, and said baffle further includes a plurality of intake openings generally above said blower for returning air from beneath the serving pan to the blower such that this return air within the closed heating space is again heated by the heating element and to be discharged above the upper surface of the baffle to further heat the serving pan.

2. The food warmer assembly of claim 1, wherein each of said plurality of intake openings is sized so that a human finger cannot pass therethrough.

3. The food warmer assembly of claim 2 wherein the plurality of intake openings comprises openings having an oblong shape.

4. The food warmer assembly of claim 2 wherein the plurality of intake openings comprises openings of a circular shape arranged in a generally circular pattern above the blower.

5. The food warmer assembly of claim 2 wherein the plurality of intake openings comprises openings of a generally arcuate shape arranged in a generally circular pattern above the blower.

6. The food warmer assembly of claim 2 wherein the baffle has extending about its outer perimeter an upwardly extending lip.

7. The food warmer assembly of claim 2 wherein the well has a cylindrical shape, the baffle has a generally circular shape, and the heating element has a generally circular shape, and wherein the plurality of intake openings comprises openings arranged in a generally circular pattern above the blower.

8. The food warmer assembly of claim 7 wherein the baffle has extending about its outer perimeter an upwardly extending lip.

9. The food warmer assembly of claim 1, wherein the baffle has one or more passageway openings to the outside of the plurality of intake openings, each of the passageway openings having an outer edge and an inner edge, with a vane depending downwardly from the outer edge toward the blower, the vane being capable of turning air blown by the blower beneath the baffle to pass through the passageway to above the upper side of the baffle.

10. The food warmer assembly of claim 9, wherein the well has a rectangular shape, and wherein the baffle is of a generally rectangular shape having two longitudinal edges and two transverse end edges, said baffle being configured to fit within the well, and wherein the two passageway openings in said baffle extend in a longitudinal direction, and wherein the heating element has a rectangular shape configured to fit within the well generally below said baffle, said heating element having two longitudinal sections parallel to each other, each longitudinal heating element section being located generally beneath a corresponding passageway opening, with the blower positioned to be within the longitudinal heating element sections.

11. The food warmer assembly of claim 9 wherein the well has a rectangular shape, and wherein the baffle has two longitudinal edges and two transverse end edges, and wherein the two passageway openings extend in a longitudinal direction along opposite sides of the baffle, and wherein the baffle also has two passageway openings that each extend in a transverse direction along opposite sides of the baffle, each transverse passageway opening having an outer edge and an inner edge, with a vane depending downwardly from the outer edge toward the blower, with the blower positioned to be within the heating element structure and within the longitudinal and transverse passageways.

12. The food warmer assembly of claim 9 wherein the well has a rectangular shape, and wherein the baffle has two longitudinal edges and two transverse end edges, wherein the two passageway openings extend in a longitudinal direction along opposite sides of the baffle, and wherein the heating element has a rectangular shape with two longitudinal element sections parallel to each other and two transverse element sections parallel to each other, each longitudinal heating element section being located generally beneath a corresponding longitudinal passageway opening, and wherein the baffle also has two passageway openings that each extend in a transverse direction, the transverse passageway openings extending along opposite sides of the baffle, each transverse passageway opening having an outer edge and an inner edge, with a vane depending downwardly from the outer edge toward the blower, each transverse vane being capable of turning air blown by the blower beneath the baffle to pass through the passageway to above the upper side of the baffle; with the blower positioned to be within the longitudinal and transverse heating element sections.

13. The food warmer assembly of claim 12 wherein the vane extending along each longitudinal passageway opening and the vane extending along each transverse passageway opening, extend at an angle relative to the plane of the baffle of from about 30° to about 60° toward the blower.

14. The food warmer assembly of claim 12 wherein the vane extending along each longitudinal passageway opening and the vane extending along each transverse passageway opening, extend at an angle of from about 45 o relative to the plane of the baffle toward the blower.

15. The food warmer assembly of claim 10 wherein the baffle comprises at least four transverse extending passageway openings, two of which are located on one side toward a transverse end of the baffle, and two of which are located on the opposite side toward the other transverse end of the baffle, each transverse passageway opening having an outer edge and an inner edge, with a transverse vane depending downwardly from the outer edge toward the blower, so that at each end of the baffle are an inner and an outer transverse passageway opening with vane, with the angle relative to the plane of the baffle of each of the four transverse vanes being from about 30° to about 60° toward the blower, with the downward length of the two inner located vanes being shorter than that of the two outer located vanes by a distance of from about 0.25" to about 1.00".

16. The food warmer assembly of claim 10 wherein the baffle comprises at least six transverse extending passageway openings, three of which are located on one side toward a transverse end of the baffle, and three of which are located on the opposite side toward the other transverse end of the baffle, each transverse passageway opening having an outer edge and an inner edge, with a transverse vane depending downwardly from each outer edge toward the blower, so that at each end of the baffle are an inner, a middle and an outer transverse passageway opening with vane, with the angle relative to the plane of the baffle of each of the six transverse vanes being from about 30° to about 60° toward the blower; with the downward length of the two inner located vanes being shorter than that of the two middle located vanes by a distance of from about 0.25" to about 0.75", and with the downward length of the two middle located vanes being shorter than that of the two outer located vanes by a distance of from about 0.75" to about 1.50".

17. The food warmer assembly of claim 16 wherein the vane extending along each longitudinal passageway opening and the vane extending along each transverse passageway opening, extend at an angle relative to the plane of the baffle of from about 30° to about 60° toward the blower.

18. The food warmer assembly of claim 16 wherein the vane extending along each longitudinal passageway opening and the vane extending along each transverse passageway opening, extend at an angle of from about 45° relative to the plane of the baffle toward the blower.

19. The food warmer assembly of claim 1, further comprising a motor, the motor having a shaft, the shaft being drivingly connected with the blower.

20. A dry well food warmer assembly for warming food located within a serving pan, the serving pan having a closed bottom and side walls extending up from the closed bottom, said food warmer comprising:
 a housing forming a well having a generally rectangular shape, the well including a bottom wall with a floor surface, and a well outer wall structure located upwardly of the bottom wall, wherein the closed bottom is installed within the well and the well is configured to receive at least a portion of the side walls of the serving pan so as to define a closed heating space;
 a heating element configured to heat air and mounted within the well, wherein the heating element is arranged in the closed heating space and generally oriented in a plane that is generally parallel to the floor;
 a blower rotatably mounted relative to the well to rotate about an axis that is generally perpendicular to the well floor surface, the blower having a plurality of blades configured to blow air generally outwardly, the heating element being positioned so that the blower is capable of blowing air outwardly around the heating element to heat the air and toward the well outer wall structure;
 wherein the closed bottom of the serving pan is configured to reflect the heated air so that the heated air is isolated and circulates within the closed heating space thereby heat the food contained in said serving pan;
 a baffle plate mounted within the well and arranged in the closed heating space, the baffle plate generally extending in a plane that is generally parallel to the floor and generally parallel to the plane of the heating element; the baffle plate having an upper side and a lower side, the lower side having a substantial portion located above the heating element, the baffle plate being configured to direct heated air discharged by the blower upwardly against at least a portion of the closed bottom of the serving pan for heating food therein; the baffle plate having a plurality of intake openings extending through the baffle plate and located generally over the blower; and the baffle plate being somewhat smaller than the well and having two longitudinal edges and two transverse end edges spaced from the adjacent sides of the well defining spaces between the edges of the baffle plate and the sides of the well, the baffle plate having one or more outlet openings spaced outwardly from the plurality of intake openings so that when the food warmer is in operation air discharged by said blower passes over the heating element so as to be heated, and then passes through the space between the edges of the baffle and the sides of the well and through said one or more outlet openings in the baffle plate such that heated air contacts at least the closed bottom of the pan thereby to heat the food within the pan, wherein air from within the well above the upper surface of the baffle plate is returned to the blower via the plurality of intake openings.

21. A method of warming human food contained in a serving pan located within a housing, comprising the steps of:

energizing a heating element to heat air in a closed heating space and located within a wall structure of a well of the housing above a floor of the well, wherein the serving pan includes a closed bottom and a side wall, which are configured to define the closed heating space with the floor and the wall structure of the well;

energizing a blower rotatably mounted relative to the well to rotate the blower about an axis that is generally perpendicular to the well floor surface, the heating element arranged in the closed heating space and being positioned to the outside of the blower, the blower having blades adapted to force air outwardly;

the blower having blades configured on the blower to be capable of blowing air outwardly from the blower toward the well outer wall structure and toward the heating element such that the heated air circulates within the closed heating space;

blowing air generally outwardly from the blower beneath a baffle plate arranged in the closed heating space, past the heating element to heat the air, and forcing the heated air outwardly toward the well outer wall structure and upwardly above the upper side of the baffle plate; and reflecting the heated air by the closed bottom of the serving pan to heat at least the closed bottom of the serving pan, and then to return the heated air within the closed heating space from above the baffle plate back to the blower so that the blower thence again, blows the heated air past the heating element and force the heated air upwardly into contact with the closed bottom of the serving pan.

22. The method of claim 21, further comprising:

wherein during the step of air passing above the upper baffle side toward and through the baffle open structure, the air passes through a plurality of intake openings that are sized so that a human finger cannot pass there through, with the plurality of openings located directly above the blower, and then passes toward the interior area of the blower.

* * * * *